US011971293B2

(12) United States Patent
Trakhimovich

(10) Patent No.: US 11,971,293 B2
(45) Date of Patent: Apr. 30, 2024

(54) SYSTEMS AND METHODS FOR WEIGHING PRODUCTS ON A SHELF

(71) Applicant: SHEKEL SCALES (2008) LTD., Beit Keshet (IL)

(72) Inventor: Michael Trakhimovich, Gan Ner (IL)

(73) Assignee: SHEKEL SCALES (2008) LTD., Beit Keshet (IL)

(*) Notice: Subject to any disclaimer, the term of this patent is extended or adjusted under 35 U.S.C. 154(b) by 717 days.

(21) Appl. No.: 17/113,072

(22) Filed: Dec. 6, 2020

(65) Prior Publication Data

US 2021/0148750 A1 May 20, 2021

Related U.S. Application Data

(63) Continuation-in-part of application No. PCT/IB2019/054746, filed on Jun. 6, 2019.

(30) Foreign Application Priority Data

Jun. 6, 2018 (GB) ..................................... 1809332
Sep. 6, 2018 (GB) ..................................... 1814504

(51) Int. Cl.
*G01G 3/14* (2006.01)
*G01G 19/42* (2006.01)
(Continued)

(52) U.S. Cl.
CPC ........... *G01G 3/1412* (2013.01); *G01G 19/42* (2013.01); *G01G 19/52* (2013.01); *G06Q 10/087* (2013.01)

(58) Field of Classification Search
USPC ....................................................... 177/210
See application file for complete search history.

(56) References Cited

U.S. PATENT DOCUMENTS 3,927,132 A 12/1975 Willis et al.
3,927,139 A 12/1975 Bozer et al.
(Continued)

FOREIGN PATENT DOCUMENTS

CA 2071223 A1 6/1991
CN 2276152 Y 3/1998
(Continued)

OTHER PUBLICATIONS

International Search Report for PCT/IB2019055488 dated Jan. 2, 2020.
(Continued)

*Primary Examiner* — Jacques M Saint Surin
(74) *Attorney, Agent, or Firm* — Momentum IP; Marc Van Dyke

(57) ABSTRACT

A shelf assembly for tracking the weight of non-homogeneous products stored thereupon in a refrigerator comprises a weighing base comprising opposing load-cell bases detachedly attachable to respective left and right internal walls of the refrigerator, a shelf frame or at least one beam member joining respective said opposing load-cell bases so as to form, in combination therewith, a rigid shelf frame, the rigid shelf frame being open to a vertical airflow over at least 25% of its horizontal surface area; a shelf open to a vertical airflow over at least 50% of its horizontal surface area; and a plurality of load cell assemblies fixedly attached to each of respective said opposing load-cell bases so as to mediate between the load-cell bases and the shelf. The shelf can be a wire-grid shelf.

20 Claims, 14 Drawing Sheets

(51) Int. Cl.
*G01G 19/52* (2006.01)
*G06Q 10/087* (2023.01)

(56) References Cited

U.S. PATENT DOCUMENTS

| | | | |
|---|---|---|---|
| 4,542,800 | A | 9/1985 | Knothe et al. |
| 4,548,086 | A | 10/1985 | Kastel |
| 4,600,066 | A | 7/1986 | Griffen et al. |
| 5,199,814 | A | 4/1993 | Clark et al. |
| 5,510,581 | A | 4/1996 | Angel |
| 5,651,616 | A | 7/1997 | Hustak et al. |
| 5,671,362 | A | 9/1997 | Cowe et al. |
| 5,929,391 | A | 7/1999 | Petrucelli et al. |
| 6,555,767 | B1 | 4/2003 | Lockery et al. |
| 7,679,009 | B2 | 3/2010 | Weichao |
| 8,648,267 | B2 | 2/2014 | Honda et al. |
| 8,664,547 | B2 * | 3/2014 | Werner .................... G01G 3/10 177/229 |
| 9,046,408 | B2 | 6/2015 | Chan |
| 9,695,101 | B2 | 7/2017 | Shaver et al. |
| 9,766,113 | B2 | 9/2017 | Trakhimovich |
| 10,007,892 | B1 | 6/2018 | Hahn et al. |
| 10,121,121 | B1 * | 11/2018 | De Bonet .............. A47B 57/34 |
| 10,126,186 | B2 | 11/2018 | Berme et al. |
| 10,198,710 | B1 | 2/2019 | Hahn et al. |
| 10,274,359 | B2 | 4/2019 | Trakhimovich |
| 10,527,508 | B2 | 1/2020 | Berme et al. |
| 10,614,415 | B1 * | 4/2020 | De Bonet ............ A47B 96/028 |
| 10,641,643 | B2 | 5/2020 | Trakhimovich |
| 10,704,951 | B2 | 7/2020 | Trakhimovich |
| 10,765,936 | B2 | 9/2020 | Berme et al. |
| 10,816,419 | B2 | 10/2020 | Lisiak |
| 11,092,477 | B2 | 8/2021 | Trakhimovich |
| 11,493,268 | B2 * | 11/2022 | Ryu ..................... F25D 25/025 |
| 11,607,059 | B2 * | 3/2023 | Fritsch ................. A47F 5/0018 |
| 11,609,132 | B2 * | 3/2023 | Fritsch ................. G01G 21/244 |
| 2003/0047603 | A1 | 3/2003 | Lustenberger et al. |
| 2004/0238236 | A1 | 12/2004 | Linglin et al. |
| 2005/0061553 | A1 | 3/2005 | Wang et al. |
| 2005/0145032 | A1 | 7/2005 | Takeuchi et al. |
| 2006/0051553 | A1 | 3/2006 | Kaplo et al. |
| 2007/0069867 | A1 | 3/2007 | Fleisch et al. |
| 2008/0022784 | A1 | 1/2008 | Wehinger et al. |
| 2008/0140087 | A1 | 6/2008 | Barbagli |
| 2013/0220709 | A1 | 8/2013 | Trakhimovich |
| 2014/0291042 | A1 | 10/2014 | Tsutaya et al. |
| 2015/0096387 | A1 | 4/2015 | Berme et al. |
| 2015/0107913 | A1 | 4/2015 | Trakhimovich |
| 2015/0314507 | A1 | 11/2015 | Jang |
| 2016/0048798 | A1 | 2/2016 | Meyer et al. |
| 2016/0363475 | A1 | 12/2016 | Bedetti et al. |
| 2017/0199073 | A1 | 7/2017 | Carreel et al. |
| 2017/0211965 | A1 | 7/2017 | Trakhimovich |
| 2017/0249587 | A1 | 8/2017 | Jones et al. |
| 2018/0031412 | A1 | 2/2018 | Trakhimovich |
| 2019/0015702 | A1 | 1/2019 | Krebs et al. |
| 2019/0301921 | A1 | 10/2019 | Trakhimovich |
| 2019/0324441 | A1 | 10/2019 | Cella et al. |
| 2020/0326225 | A1 | 10/2020 | Trakhimovich |
| 2021/0131857 | A1 * | 5/2021 | Trakhimovich ..... G06Q 10/087 |
| 2021/0148750 | A1 | 5/2021 | Trakhimovich |
| 2021/0148751 | A1 * | 5/2021 | Yadai ................. G01G 19/52 |
| 2021/0334739 | A1 * | 10/2021 | O'Neil ................. G01G 19/42 |
| 2022/0011150 | A1 | 1/2022 | Trakhimovich |

FOREIGN PATENT DOCUMENTS

| | | | |
|---|---|---|---|
| CN | 2436383 | Y | 6/2001 |
| CN | 2676166 | Y | 2/2005 |
| CN | 1869610 | A | 11/2006 |
| CN | 2874442 | Y | 2/2007 |
| CN | 203572558 | U | 4/2014 |
| CN | 104395715 | A | 3/2015 |
| CN | 105102056 | A | 11/2015 |
| CN | 205483198 | U | 8/2016 |
| CN | 206339001 | U | 7/2017 |
| CZ | 31014 | U1 | 9/2017 |
| DE | 102006024385 | A1 | 12/2006 |
| EP | 0505493 | A1 | 9/1992 |
| EP | 0742426 | A1 | 11/1996 |
| EP | 0771410 | A1 | 5/1997 |
| EP | 0789232 | A2 | 8/1997 |
| EP | 1345016 | A1 | 9/2003 |
| EP | 2784451 | A1 | 10/2014 |
| EP | 2784452 | A1 | 10/2014 |
| EP | 3070607 | A1 | 9/2016 |
| EP | 3729018 | A1 | 10/2020 |
| EP | 3815013 | A1 | 5/2021 |
| EP | 3818345 | A1 | 5/2021 |
| GB | 2528897 | A | 2/2016 |
| JP | H08110260 | A | 4/1996 |
| WO | 2013059716 | A2 | 4/2013 |
| WO | 2013164675 | A1 | 11/2013 |
| WO | 2016181352 | A1 | 11/2016 |
| WO | 2019024951 | A1 | 2/2019 |
| WO | WO 2019220400 | A1 * | 11/2019 ............. G01G 19/42 |

OTHER PUBLICATIONS

Written Opinion for PCT/IB2019055488 dated Jan. 2, 2020.
International Search Report for PCT/IB2019054746 dated Dec. 12, 2019.
Written Opinion for PCT/IB2019054746 dated Dec. 12, 2019.
International Search Report for PCT/IB2020055761 dated Dec. 30, 2020.
Written Opinion for PCT/IB2020055761 dated Dec. 30, 2020.
International Search Report for PCT/IB2018/060588 dated Jun. 27, 2019.
Written Opinion for PCT/IB2018/060588 dated Jun. 27, 2019.
International Search Report for PCT/IB2019054082 dated Nov. 21, 2019.
Written Opinion for PCT/IB2019054082 dated Nov. 21, 2019.
JPH08110260 Machine Translation (by google translate)—published Apr. 30, 1996.
CZ31014 Machine Translation (by google translate)—published Sep. 12, 2017.
DE102006024385 Machine Translation (by google translate)—published Dec. 21, 2006.
CN104395715 Machine Translation (by google translate)—published Jun. 12, 1991.
CN 105102056 Machine Translation (by google translate)—published Nov. 25, 2015.
CN 1869610 Machine Translation (by google translate)—published Nov. 29, 2006.
CN203572558 Machine Translation (by google translate)—published Apr. 30, 2014.
CN205483198 Machine Translation (by google translate)—published Aug. 17, 2016.
CN 206339001 Machine Translation (by google translate)—published Jul. 18, 2017.
CN 2276152 Machine Translation (by google translate)—published Mar. 11, 1998.
CN 2436383 Machine Translation (by google translate)—published Jun. 27, 2001.
CN 2676166 Machine Translation (by google translate)—published Feb. 2, 2005.
CN 2874442 Machine Translation (by google translate)—published Feb. 28, 2007.
Magnesium AM60B Cast Alloy M10602" by AZoMJul. 29, 2013: https://www.azom.com/article.aspx?ArticleID=9237 (Year: 2013).
Overview of materials for 2000 Series Aluminium Alloy, MATWEB http://www.matweb.com/search/DataSheet.aspx?MatGUID=2076184469d740af9f86b-0d69b2e42ff (Year: 2020).
Written Opinion for PCT/IB2020/062590 dated Apr. 22, 2021.
International Search Report for PCT/IB2020/062590 dated Apr. 22, 2021.

(56) References Cited

OTHER PUBLICATIONS

Co-pending U.S. Appl. No. 17/789,195, inventor Ehud Hahamy, filed Jun. 26, 2022.

* cited by examiner

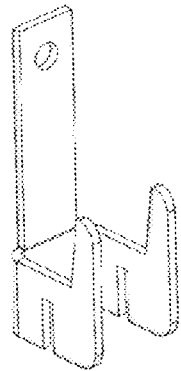
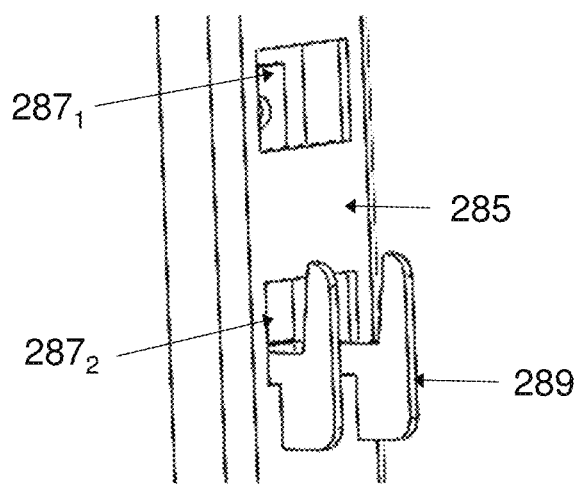
FIG. 2B
FIG. 2C
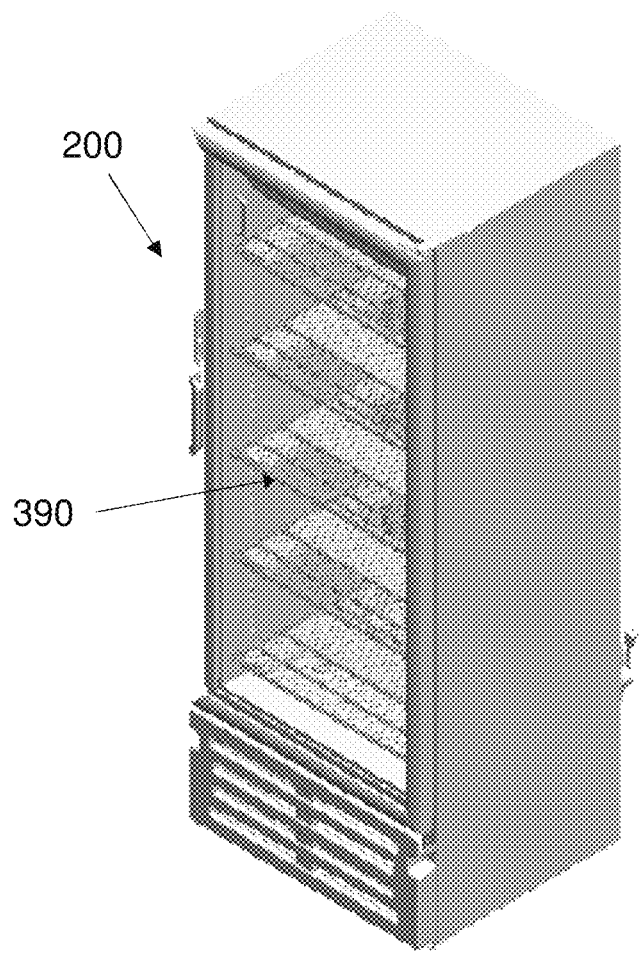
FIG. 2D

TOP PERSPECTIVE

BOTTOM PERSPECTIVE

SYSTEMS AND METHODS FOR WEIGHING PRODUCTS ON A SHELF

CROSS-REFERENCE TO RELATED APPLICATIONS

This application is a continuation-in-part of International Patent Application No. PCT/IB2019/054746 filed on Jun. 6, 2019, and published as WO/2019234692 on Dec. 12, 2019, which is incorporated by reference for all purposes as if fully set forth herein. This invention claims priority from the following patent applications: Great Britain Patent Application No. 1809332.8, filed on Jun. 6, 2018; Great Britain Patent Application No. 1814504.5, filed on Sep. 6, 2018; International Application No. PCT/IB2018/060588, filed on Dec. 24, 2018, and International Application No. PCT/IB2019/054082, filed on May 16, 2019, all of which applications are incorporated by reference for all purposes as if fully set forth herein.

FIELD OF THE INVENTION

The present invention relates to weighing devices and assemblies, including weighing devices and assemblies for shelves in refrigerator units, on which non-homogeneous assortments of products can be arranged, and methods for their use in tracking the weights, locations and identifications of products added to and removed from shelves.

BACKGROUND

Unattended or autonomous retail and inventory management are examples of areas that can benefit from the use of methods for weighing and tracking products on shelves. Technical solutions have been suggested for intelligent shelving arrangements that would track the weight of products on a shelf, including changes in the weight resulting from the addition of products or the removal of products. An example of such a suggested solution is a shelf segment assembly with load cells attached to the underside so that when the shelf segment is placed atop an existing 'regular' shelf, weights of the products on the shelf can be tracked. Such solutions are lacking in terms of being able to disambiguate unique products in diverse collections of products, instead dedicating each small shelf or shelf insert to a single product or stock-keeping unit (SKU).

Examples of shelving arrangements include connected shelving bays and standalone shelving arrangements. Connected shelving bays use a familiar type of shelving unit common in supermarkets and other retail stores. Standalone shelving arrangements are usually not connected to other shelving units and are often used in smaller retail environments such as, for example, kiosks, convenience stores, public areas of shopping malls, or shops in public venues such as train stations or airports.

SUMMARY

Embodiments of the present invention relate to shelving units and shelf assemblies having weighing capabilities.

According to embodiments, a shelf assembly for tracking the weight of non-homogeneous products stored thereupon in a refrigerator comprises: (a) a weighing base comprising: (i) opposing load-cell bases detachedly attachable to respective left and right internal walls of the refrigerator, (ii) a shelf frame or at least one beam member joining respective said opposing load-cell bases so as to form, in combination therewith, a rigid shelf frame, the rigid shelf frame being open to a vertical airflow over at least 25% of its horizontal surface area; (b) a shelf open to a vertical airflow over at least 50% of its horizontal surface area; and (c) a plurality of load cell assemblies fixedly attached to each of respective said opposing load-cell bases so as to mediate between the load-cell bases and the shelf, each load cell assembly comprising: (i) a load cell body having a free end and an anchored portion, said load cell body including a spring element and at least one receiving element, and (ii) a strain-sensing gage, bonded to said spring element, said strain-sensing gage adapted to measure a strain in said spring element, wherein, in an assembled configuration, (i) said load cell body is attached to said horizontal member at said anchored portion of the load cell body, and (ii) said at least one receiving element is adapted to receive a vertical load from the shelf, said receiving element has (A) an unloaded disposition, and (B) a loaded disposition in which said at least one receiving element receives said vertical load, wherein in said loaded disposition, said free end attains a depressed position with respect to said free end in said unloaded disposition.

In some embodiments, said load cell body can have a primary axis, a central longitudinal axis, and a transverse axis disposed transversely with respect to said primary and central longitudinal axes, a broad dimension of said load cell body being disposed perpendicular to said primary axis, and said load cell body can include: (A) a first contiguous cutout window passing through said broad dimension and formed by a first pair of cutout lines disposed generally parallel to said central longitudinal axis, and connected by a first cutout base, (B) a second contiguous cutout window passing through said broad dimension and formed by a second pair of cutout lines disposed generally parallel to said central longitudinal axis, and connected by a second cutout base, said second contiguous cutout window being transversely bounded by said first contiguous cutout window, (C) a pair of measuring beams disposed along opposite edges of said load cell body and generally parallel to said central longitudinal axis, each of said measuring beams longitudinally defined by a respective cutout line of said first pair of cutout lines, (D) a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base, and (E) a loading element, longitudinally defined by an innermost pair of cutout lines, comprising a receiving element and extending from an innermost flexure base, said transverse axis passing through said loading element. In some such embodiments, said load cell body can additionally include: (F) a third contiguous cutout window passing through said broad dimension and formed by a third pair of cutout lines disposed parallel to said central longitudinal axis, and connected by a third cutout base, and (G) a second flexure arrangement having a second pair of flexure beams, disposed along opposite sides of said central longitudinal axis, and parallel thereto, said second pair of flexure beams longitudinally disposed between said second pair of cutout lines and said third pair of cutout lines, and mechanically connected by a second flexure base, wherein said loading element can longitudinally defined by said third pair of cutout lines, and extending from said second flexure base.

In some embodiments, said at least one strain-sensing gage can be associated with a processing unit configured to receive strain signals therefrom, and to produce a weight indication based on said strain signals. In some such embodiments, the shelf assembly can comprise a communications arrangement for sending information about the weight indication to a computing device, wherein the computing device includes a software module for determining, based on the information, that a product has been added to or removed from a shelf. In some such embodiments, the product can be a member of a group of non-homogeneous products, and/or the determining by the software module can additionally include identifying the product that has been added or removed from the shelf. In some such embodiments, the group of non-homogeneous products can be characterized by a plurality of SKU-identifiers, and the identifying includes identifying a SKU-identifier. In some embodiments, said computing device can includes a software module for performing, based on the result of the determining, at least one of a retail sales transaction and an inventory adjustment in a computerized inventory system.

In some embodiments, it can be that (i) the shelf comprises a wire-grid shelf, (ii) said pluralities of load-cell assemblies are arranged to form opposing pairs of load-cell assemblies, and (iii) the wire-grid shelf includes a plurality of left-to-right wires disposed such that each opposing pair of said opposing pairs of load-cell assemblies is in contact with at least one respective left-to-right wire.

In some embodiments, said shelf can comprise an upwardly extending rim member on at least one of the four sides of said shelf, said rim member being sized and/or disposed so as to prevent a product borne by said shelf to transfer any of its weight load directly to a wall or door of the shelving unit by leaning thereupon.

In some embodiments, said rigid shelf frame can be open to a vertical airflow over at least 40% of its horizontal surface area.

A display refrigerator can comprise a plurality of shelf assemblies according to the foregoing embodiments and the computing device according to the foregoing embodiments. In some embodiments, the refrigerator can additionally comprise a retail transaction apparatus.

A method is disclosed, according to embodiments, of tracking inventory of non-homogeneous products in a refrigerator. The method comprises: (a) tracking weight of non-homogeneous products stored on a shelf assembly disposed in the refrigerator, the shelf assembly comprising (i) opposing load-cell bases detachedly attached to respective left and right internal walls of the refrigerator, (ii) a shelf frame or at least one beam member joining respective said opposing load-cell bases so as to form, in combination therewith, a rigid shelf frame, the rigid shelf frame being open to a vertical airflow over at least 25% of its horizontal surface area, (iii) a shelf open to a vertical airflow over at least 50% of its horizontal surface area, and (iv) a plurality of load cell assemblies fixedly attached to each of respective said opposing load-cell bases so as to mediate between the load-cell bases and the wire-grid shelf, each load cell assembly comprising: (A) a load cell body having a free end and an anchored portion, said load cell body including a spring element and at least one receiving element, and (B) a strain-sensing gage, bonded to said spring element, said strain-sensing gage adapted to measure a strain in said spring element; (b) in response to a change in weight of the products on the shelf assembly, sending information about the weight of the products from at least one weighing assembly of said plurality of weighing assemblies to a computing device; and (c) in response to receiving the information about the weight of the products: (i) determining, by the computing device, that a product has been added to or removed from the shelf assembly, and (ii) in response to the determining that a product has been added to or removed from the shelf assembly, identifying the product added or removed.

In some embodiments, the products can be characterized by a plurality of SKU-identifiers, and the identifying can include determining an SKU-identifier.

In some embodiments, the method can additionally comprise the step of recording a change in an inventory management system.

In some embodiments, the method can additionally comprise the step of completing a retail sales transaction, using the result of the determining and of the further determining.

In some embodiments, it can be that (i) the shelf comprises a wire-grid shelf, (ii) said pluralities of load-cell assemblies are arranged to form opposing pairs of load-cell assemblies, and (iii) the wire-grid shelf includes a plurality of left-to-right wires disposed such that each opposing pair of said opposing pairs of load-cell assemblies is in contact with at least one respective left-to-right wire.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 2B is a schematic perspective view of an attachment component of an alternative embodiment;

FIG. 2C schematically illustrates the attachment component of FIG. 2B engaged with an attachment element of a shelving unit 200, according to embodiments;

FIG. 2D is a schematic perspective view of a refrigerator according to embodiments of the present invention;

DETAILED DESCRIPTION OF THE ILLUSTRATED EMBODIMENTS

Figure 1:
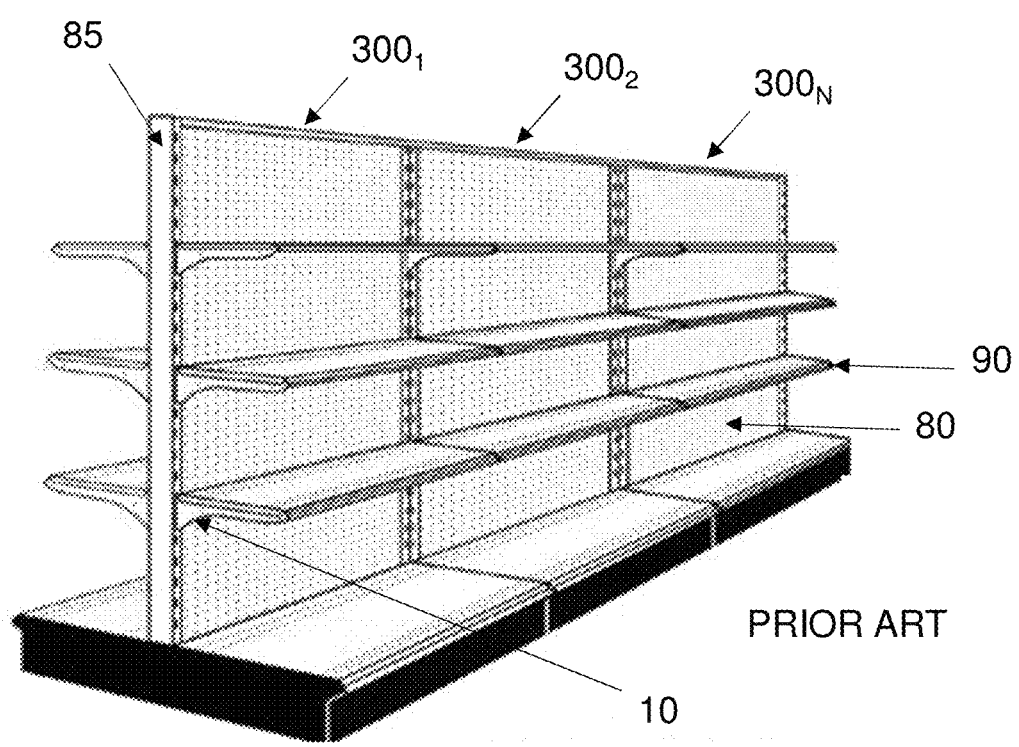
FIG. 1 is a perspective view of a prior art double-sided gondola-type shelving arrangement comprising three shelving units 300.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements. Subscripted reference numbers (e.g., $10_1$) or letter-modified reference numbers (e.g., $100a$) are used to designate multiple separate appearances of elements in a single drawing, e.g. $10_1$ is a single appearance (out of a plurality of appearances) of element 10, and $100a$ is a single appearance (out of a plurality of appearances) of element 100. Similarly, 281L and 281R designate, respectively, left-side and right-side appearances of an element 281.

In accordance with embodiments of the invention, weighing-enabled shelving arrangements with autonomous weighing capabilities are disclosed. Weighing-enabled shelving arrangements can be useful for enabling unattended retail transactions where the weight of a product removed from a shelf can be automatically recorded and subsequently used in charging a customer for the product. Typically, the shelving arrangement is connected to a computing device with a tracking module for tracking the weight of all products on a given shelf. The tracking module can respond to a change in weight on the shelf (or of the shelf plus the products stored thereupon) by, for example, sending information to a retail module that charges the customer for products taken. The tracking module can respond to a change in weight on the shelf by, for example, updating an inventory record. The computing device can also include a database of products and respective weights, so that the particular product removed from the shelf can be identified, for example, by stock-keeping unit (SKU) number. Where the term "SKU" is used, any suitable unique identifier of a product as employed in an inventory management system or retail sales system can be used. The database can include or be linked to a statistical analysis of weights for any given product. The tracking module can also be linked to a retail module and/or an inventory module which process the information from the tracking module and complete a retail sales transaction and/or record a change in inventory, respectively. As used herein, the term "SKU" means stock-keeping unit. The use of SKU-identifiers is a standard means of identifying unique products across industries. Unique products can be, for example, products defined by unique combinations of physical characteristics, e.g., weight (whether nominal or average), volume, dimensions, etc. and/or non-physical characteristics, e.g., brand or packaging design. It can be that two products can be similar in physical characteristics but have different SKU-identifiers; in some embodiments they can be considered as 'non-homogeneous' and in other embodiments they may not. However, any use of the term 'products' in this disclosure or in the claims attached thereto includes the concept of 'non-homogeneous products'. In an example, a particular brand of cookies may offer products with a number of different SKU-identifiers: a first SKU for the brand's large package of large chocolate cookies, a second SKU for the brand's small package of the same large chocolate cookies, and a third SKU for the brand's large package of small chocolate cookies, and so on. The term "non-homogeneous", as applied herein to a group of products, means that the products in the group do not all share the same SKU-identifier, but should not be understood to imply that each product in a group has a unique SKU-identifier. For example, a group of non-homogeneous products might include: (a) 10 large packages of large chocolate cookies bearing a first brand and having a first SKU-identifier, and (b) 2 large packages of small chocolate cookies from a second brand and having a second SKU-identifier, or, without limitation any combination of products having, in combination, two or more SKU-identifiers. A group of products having, in combination, two or more SKU-identifiers can be considered 'non-homogeneous' with respect to one another.

Shelving Unit Embodiments

A weighing-enabled shelving arrangement can be a stand-alone unit adapted for retail sales transactions. In a non-limiting example shown in FIG. 2A, a weighing-enabled standalone shelving unit 200 includes a shelving volume 210 defined by shelving housing 205, the shelving volume 210 enclosed by left and right walls $281_L$ and $281_R$, and back wall 280. In some embodiments any one or more of left and right walls $281_L$ and $281_R$, and back wall 280 can be a partial wall. Note: the weighing capabilities and weighing-relevant components of shelf assemblies 290 are discussed below in connection with FIG. 4B. A door 220 can be provided on or near the front boundary of the shelving unit 200 (front being the direction open for access to a shelving volume 210 enclosed on three sides), the door being operative in some embodiments to preserve the interior temperature of the shelving unit 200 in the case that it is a refrigerated unit, and in some embodiments being operative for any one or more of improving hygiene, limiting entry of dust and dirt, limiting customer interaction with the products while choosing, and having a locking mechanism so as to control access to the products within the shelving unit for commercial reasons: As is known in the art, a locking mechanism can be adapted to allow opening of the door upon receipt of an electronic signal, for example from a computer system with a retail module, where the signal is part of the retail sales transaction process, e.g., allowing opening upon swiping of a card or a screen input from a user or cashier. Together with the door 220, a shelving volume 210 can be enclosed on all four sides.

Figure 2A:
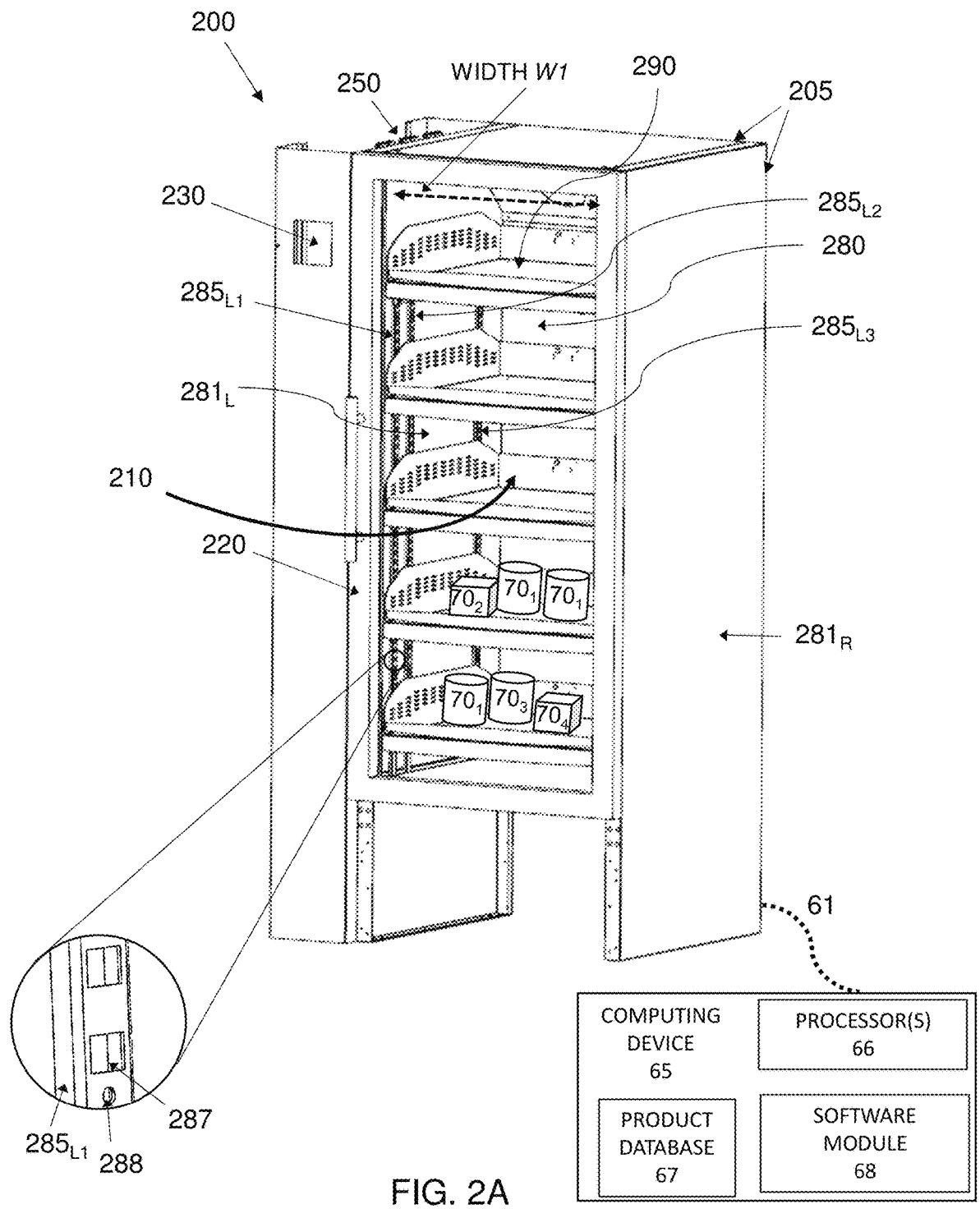
FIG. 2A is a schematic perspective view of a weighing-enabled shelving unit 200 and system, showing a detail of an attachment element, according to embodiments.

A shelving unit 200 includes at least one shelf assembly 290 (or at least shelf assembly 490 of FIG. 7, as discussed later). In FIG. 2A five shelf assemblies 290 are shown. The number of shelf assemblies 290 in a shelving unit 200 can be as few as one and as many as practicably can fit in the shelving unit while allowing access for shelf-stockers and customers to the products 70 stocked and displayed thereupon. Products can be stocked and displayed homogeneously, i.e., in groups of identical products taking up part or all of a shelf assembly 290, or mixed with non-identical products, as illustrated in FIG. 2A by the display on the two lower shelf assemblies 290 of products $70_1$, $70_2$, $70_3$ and $70_4$.

Shelf assemblies 290 are attached to one or two or three of left and right walls $281_L$, $281_R$ and back wall 280. The shelf assembly 290 can be attached directly to any of the walls and preferably is by employing one or more attachment elements 285 such as, for example, the attachment elements $285_{L1}$, $285_{L2}$, $285_{L3}$ in FIG. 2A. In some embodiments attachment elements 285 share similarities with uprights 85 used in open shelving bays (e.g., in FIG. 1), in that each comprises a plurality of attachment elements (e.g., recesses or holes) designed for the easy insertion and removal of shelf bracket hooks along a continuous strip, and are different from uprights 85 in that they are fixedly attached to a side wall 281 or back wall 280 of an enclosed shelving unit 200. In other embodiments (not shown) attachment elements 285 can be only as large as necessary for having a single attachment arrangement (e.g., recess, hole, peg, hook, etc.) for use by a single shelf, or can have several such attachment arrangements so as to allow flexibility in the height-placement of shelf assemblies 290, but without having the continuous strip configuration of the attachment arrangements shown in FIG. 2A. The detail inset of FIG. 2A shows a close-up of attachment element $285_{L1}$ which includes attachment-element-points 287. Attachment-element-points 287 are shown as holes, but in other embodiments they can be, for example, protruding members, recesses, or slots, which mate with corresponding attachments points 286 (FIG. 4B, see additional discussion below). An attachment element 285 can also include fastening arrangements 288 for fastening the attachment element 285 to a wall 281 of the shelving unit 200.

Referring now to FIGS. 2B and 2C, according to an alternative embodiment, an attachment component 289 can be provided for effecting the attachment of a shelf assembly 290 to the attachment element 285. In the non-limiting example of FIG. 2C, attachment component 289 hooks into attachment-element-point $287_2$ (the top part of attachment component 289 can also be seen through the 'window' of attachment-element-point $287_1$). In such an embodiment, the attachment points 286 of shelf assembly 290 mate with attachment components 289 rather than directly with attachment-element-points 287. The skilled artisan will understand that the attachment component 289 of FIGS. 2B and 2C is shown as one non-limiting example of an attachment component, and any component design that achieves the design goal of securing a shelf assembly (or a load base thereof) to an attachment element on a side wall of a shelving unit, and especially such that the securing is reversible and repeatable, can be suitable.

FIG. 2A shows three attachment elements $285_{L1}$, $285_{L2}$, $285_{L3}$ on the left wall $281_L$ of the shelving unit 200, and a skilled artisan can easily understand that in such an example there can be three corresponding and similar attachment elements $285_{R1}$, $285_{R2}$, $285_{R3}$ on the right wall $281_R$. However, this presentation of 3 (or, as can be reasonably extrapolated: 6) attachment elements 285 is by way of illustrative example only, and the actual number of attachment elements 285 and their respective placement is merely a design choice where the design goal is providing sufficient support in the right places for each shelf assembly 290 so that shelf assemblies 290 are substantially immobilized in a horizontal position and maximally resistant to rolling or pitching from forces reasonably applied to any of the parts of the shelf assembly 290. Such forces can be generated by, for example, uneven distribution of products, employees or customers leaning on or against a shelf assembly 290 or a child pulling himself up by grasping the front edge of a shelf assembly 290.

In some embodiments, left and right walls $281_L$, $281_R$ can be partial walls or not be present at all, in which case the lack of a front-edge attachment element on the side wall (e.g., $285_{L1}$ on the front edge of left wall $281_L$), or even no side wall attachment elements, in which the designer can put in additional structural elements for stabilizing and immobilizing the shelf assemblies 290 without deviating from the spirit of the invention.

As shown in FIG. 2A, shelving unit 200 can include a refrigeration unit 250 for chilling products 70 and keeping them at a desired temperature.

A shelving unit can also include a retail transaction apparatus 230. A retail transaction apparatus 230 can include any combination of credit card reader, cash and coin slots, and a user interface including, for example, a display screen, and be provided for the purpose of enacting payment for products 70 selected and removed from the shelving unit 200. The retail transaction apparatus need not be installed on the shelving unit 200 itself and instead can be a distance away, for example, at a cashier's position. In another example, there can be one retail transaction apparatus for a plurality of shelving units 200.

According to embodiments, a shelf assembly includes a plurality of load cell 100 which track the weight of products on the shelf assemblies 290, as well as changes in the weight, e.g., from the addition of products 70 on the shelf assembly 290 or the removal of products on the shelf assembly 290.

As will be described later in connection with the discussion of FIG. 3A, each load cell assembly 100 can include a processor, which may be configured to receive the load or strain signals from the strain (e.g., from 4 strain gages SG1-SG4) from each particular load cell and to produce a weight indication based on the load signals. Each processor can have a communications arrangement for communicating the weight indication, for example by employing a communications channel 61 which can be a wired connection or a wireless connection (as non-limiting examples: any short-range point-to-point communication system such as IrDA, RFID (Radio Frequency Identification), TransferJet, Wireless USB, DSRC (Dedicated Short Range Communications), or Near Field Communication; or wireless sensor networks such as: ZigBee, EnOcean; Personal area networks, Bluetooth, TransferJet, or Ultra-wideband). Still referring to FIG. 2A, the communications arrangement of a weighing-enabled shelving unit 200 (or of a processor associated with the shelving unit) is of course selected so as to be appropriate to the communications technology chosen for the communications channel 61. The communication of weight indication(s) by load cells 100 via the communications channel 61 can be to a computing device 65 configured to receive information from the weighing assemblies and track the weights of shelf assemblies 290 and of the products 70 displayed thereupon. The computing device 65 can include one or more processors 66 for executing computer code, a software module 67 that includes computer code for execution by the one or more processors 66, and/or a product database 68. Preferably, the computer code includes executable instructions for processing the received information about shelf assembly weights (the weight indications) and determining (a) that a change in weight of a shelf assembly has changed, (b) that a product 70 has been added to or removed from a shelf and (c) which product has been added to or removed from a shelf. Preferably, the computing device 65 receives weight indications from all of the individual load cell assemblies 100 installed in any one specific shelf assembly 290, so that the determinations will be more accurate and more reliable. The determination (a) that a change in weight of a shelf assembly 290 has changed can be made, for example, by tracking the weight of as shelf assembly 290 over time and comparing one time-based value to another. The determination (b) that a product 70 has been added to or removed from a shelf assembly 290 can be made, for example, by determining that the determined change in the weight of a shelf assembly 290 is substantial enough to be a product movement, i.e., is not below a pre-determined threshold. For example, a child leaving chewing gum on a shelf assembly 290 may register as a change in weight of the shelf assembly 290, but the change can be determined as not being substantial enough to be a product movement. Similarly, the computer code can be configured to exclude 'false positives' such as a person leaning on the shelf, or a person leaving an unidentified weight (i.e., not correlating with a known product) on the shelf. The determination (c) which product has been added to or removed from a shelf is made by analyzing the change in weight from the addition or removal, and by looking up product weights in a product database 67 which includes product weights and SKU-identifiers. The product database 67 can optionally include statistical and/or historical information about the distribution of weight for a particular product/SKU-identifier. The determining can optionally include applying the statistical and/or historical information to help in the determining.

FIG. 2D shows an example of a shelving unit 200 configured as a display refrigerator. To ensure adequate internal airflow, shelf assemblies 390 can be provided with open spaces horizontal surfaces so as to be at least partly open for a vertical airflow.

Discussion of Load Cell Assembly Embodiments

Load cells with low profiles may have a characteristically low amplitude signal. Given limitations in the total weight to be measured, and the inherent sensitivity of load cells, the performance of such devices may be compromised by a high noise-to-signal ratio and by unacceptable settling times. Various embodiments of the present invention resolve, or at least appreciably reduce, parasitic noise issues associated with typical low-profile load cells and enable high accuracy weight measurements.

Loading of a spring arrangement is effected by placing a load on, or below, a loading beam, depending on whether the loading beam is anchored to the weighing platform, or to the weighing base. (Note: the term "weighing base" is used herein interchangeable with the term "load cell base" and no difference in meaning between the two terms should be inferred.) The loading beam may also be referred to as the "loading element" or as the "load-receiving element" or "load-supporting element" (depending on the configuration) of the load cell assembly. The spring arrangement has at least one flexure arrangement having at least two flexures or flexural elements operatively connected in series. The flexure arrangement is operatively connected, at a first end, to the loading beam, and at a second end, to the free or adaptive end of at least one measuring beam.

The flexure arrangement has n flexures (n being an integer) operatively connected in series, the first of these flexures being operatively connected to the loading beam, and the ultimate flexure of the n flexures being operatively connected in series to a second flexure, which in turn, is operatively connected to the first flexure in an assembly of m flexures (m being an integer), operatively connected in series. The ultimate flexure of the m flexures is operatively connected, in series, to a measuring beam of the spring arrangement. Associated with the measuring beam is at least one strain gage, which produces weighing information with respect to the load.

The inventor has discovered that at least two of such flexure arrangements, disposed generally in parallel, may be necessary for the loading element to be suitably disposed substantially in a horizontal position (i.e., perpendicular to the load).

In some embodiments, and particularly when extremely high accuracy is not necessary, a single flexure disposed between the loading beam and the measuring beam may be sufficient. This single flexure load cell arrangement may also exhibit increased crosstalk with other load cell arrangements (weighing assemblies may typically have 4 of such load cell arrangements for a single weighing platform). For a given nominal capacity, the overload capacity may also be compromised with respect to load cell arrangements having a plurality of flexures disposed in series between the load receiving beam and the measuring beam. This reduced overload capacity may be manifested as poorer durability and/or shorter product lifetime, with respect to load cell arrangements having a plurality of flexures disposed in series. Nonetheless, the overall performance of the single-flexure may compare favorably with conventional weighing apparatus and load cell arrangements. In any event, for this case, m+n=−1, which is the lowest value of m+n flexures for the present invention.

Moreover, there may be two or more spring arrangements for each loading element, disposed in parallel. Typically, and as described hereinbelow with respect to FIGS. 4A and 4B, the spring arrangement may include pairs of coupled flexures and coupled measuring beams.

Typically, there are 4 strain gages per loading beam. The strain gages may be configured in a Wheatstone bridge configuration, a configuration that is well known to those of skill in the art. The load cell system may further include a processing unit, such as a central processing unit (CPU). The processing unit may be configured to receive the load or strain signals (e.g., from 4 strain gages SG1-SG4) from each particular load cell and to produce a weight indication based on the load signals, as is known to those of ordinary skill in the art.

Referring collectively to FIGS. 1A and 1B, a load cell body 125 may be made from a block of load cell quality metal or alloy. Particularly advantageous embodiments employing particular magnesium alloys will be described hereinbelow.

Load cell body 125 may be fixed to a weighing assembly 10 via one or more mounting holes or elements 142. A $1^{st}$ contiguous cutout window 116 passes from a top face 110 through a bottom face 112, perpendicularly through the broad dimension (i.e., with respect to the other 2 dimensions of a three-dimensional Cartesian system) of load cell body 125. $1^{st}$ contiguous cutout window 116 may be generally C-shaped or U-shaped, and may have arms or a pair of cutout lines 118*a*, 118*b* running generally parallel to a central longitudinal axis 102 of load cell body 125, and connected or made contiguous by a cutout line or cutout base 118c. Both central longitudinal axis 102 and a transverse axis 104, disposed transversely thereto, run generally parallel to the broad dimension of load cell body 125. Both of these axes are oriented in perpendicular fashion with respect to a primary axis 114. The thickness (indicated by the arrow marked 't' in FIG. 4B) of load cell body 125 perpendicular to primary axis 114 is typically within a range of 2 mm to 10 mm, and is designated $W_{LCB}$.

Long sides 105a and 105b of load cell body 125 run generally along, or parallel to, central longitudinal axis 102.

As shown, measuring beams or spring elements 107a and 107b are each disposed between respective cutout lines 118a and 118b, and respective long sides 105a and 105b of load cell body 125, distal to cutout lines 118a and 118b with respect to transverse axis 104. When planar load cell assembly 100 is disposed in a vertically loaded position, the free end of each of beams 107a and 107b may be held in a fixed relationship, substantially perpendicular to the vertical load, by an end block 124 disposed at a free end 123 of load cell body 125.

A $2^{nd}$ contiguous cutout window 126 also passes from top face 110 through bottom face 112, perpendicularly through the broad dimension of load cell body 125. $2^{nd}$ contiguous cutout window 126 may be generally C-shaped or U-shaped, and may have arms or a pair of cutout lines 128a, 128b running generally parallel to central longitudinal axis 102, and connected or made contiguous by a cutout line or cutout base 128c. $2^{nd}$ contiguous cutout window 126 may be enveloped on three sides by $1^{st}$ contiguous cutout window 116 (such that the $2^{nd}$ contiguous cutout window is transversely bounded by the $1^{st}$ contiguous cutout window). The orientation of $2^{nd}$ contiguous cutout window 126 may be 180° (i.e., generally opposite) with respect to $1^{st}$ contiguous cutout window 116.

A $3^{rd}$ contiguous cutout window 136 also passes from top face 110 through bottom face 112, perpendicularly through the broad dimension of load cell body 125. $3^{rd}$ contiguous cutout window 136 may be generally C-shaped or U-shaped, and may have arms or a pair of cutout lines 138a, 138b running generally parallel to central longitudinal axis 102, and connected or made contiguous by a cutout line or cutout base 138c. $3^{rd}$ contiguous cutout window 136 may be enveloped on three sides by $2^{nd}$ contiguous cutout window 126 (such that the $3^{rd}$ contiguous cutout window is transversely bounded by the $2^{nd}$ contiguous cutout window). The orientation of $3^{rd}$ contiguous cutout window 136 may be 180° (i.e., generally opposite) with respect to $2^{nd}$ contiguous cutout window 126 (and generally aligned with $1^{st}$ contiguous cutout window 116).

Load cell body 125 has a first flexure arrangement having a first pair of flexure beams 117a, 117b disposed along opposite sides of central longitudinal axis 102, and distal and generally parallel thereto. First pair of flexure beams 117a, 117b may be longitudinally disposed between the first pair of cutout lines and the second pair of cutout lines, and mechanically connected or coupled by a first flexure base 119.

Load cell body 125 has a second flexure arrangement having a second pair of flexure beams 127a, 127b disposed along opposite sides of central longitudinal axis 102, and distal and parallel thereto. Second pair of flexure beams 127a, 127b may be longitudinally disposed between the first pair of cutout lines and the second pair of cutout lines, and mechanically connected or coupled by a second flexure base 129.

Contiguous cutout window 136 defines a loading element 137 disposed therein. Loading element 137 is longitudinally defined by $3^{rd}$ pair of cutout lines 138a and 138b, and is connected to, and extends from, second flexure base 129.

The various cutout lines described above may typically have a width ($W_{CO}$) of 0.2 mm to 5 mm, and more typically, 0.2 mm to 2.5 mm, 0.2 mm to 2.0 mm, 0.2 mm to 1.5 mm, 0.2 mm to 1.0 mm, 0.2 mm to 0.7 mm, 0.2 mm to 0.5 mm, 0.3 mm to 5 mm, 0.3 mm to 2.5 mm, 0.3 mm to 2.0 mm, 0.3 mm to 1.5 mm, 0.3 mm to 1.0 mm, 0.3 mm to 0.7 mm, 0.3 mm to 0.6 mm, or 0.3 mm to 0.5 mm.

In some embodiments, the ratio of $W_{CO}$ to $W_{LCB}$ ($W_{CO}/W_{LCB}$) is at most 0.5, at most 0.4, at most 0.3, at most 0.25, at most 0.2, at most 0.15, at most 0.12, at most 0.10, at most 0.08, at most 0.06, or at most 0.05.

In some embodiments, the ratio of $W_{CO}$ to $W_{LCB}$ ($W_{CO}/W_{LCB}$) is within a range of 0.03 to 0.5, 0.03 to 0.4, 0.03 to 0.3, 0.03 to 0.2, 0.03 to 0.15, 0.03 to 0.10, 0.04 to 0.5, 0.04 to 0.4, 0.04 to 0.3, 0.04 to 0.2, 0.04 to 0.15, 0.04 to 0.10, 0.05 to 0.5, 0.05 to 0.4, 0.05 to 0.3, 0.05 to 0.2, 0.05 to 0.15, or 0.05 to 0.10. Loading element 137 may also include a hole 140, which may be a threaded hole, for receiving a load, e.g., for receiving or connecting to an upper, weighing platform, or for supporting a load, e.g., connecting to a base, leg, or support (disposed below load cell body 125) of a weighing system (described with respect to FIG. 7). Load-receiving hole 140 may be positioned at an intersection of central longitudinal axis 102 and transverse axis 104.

Figure 4A:
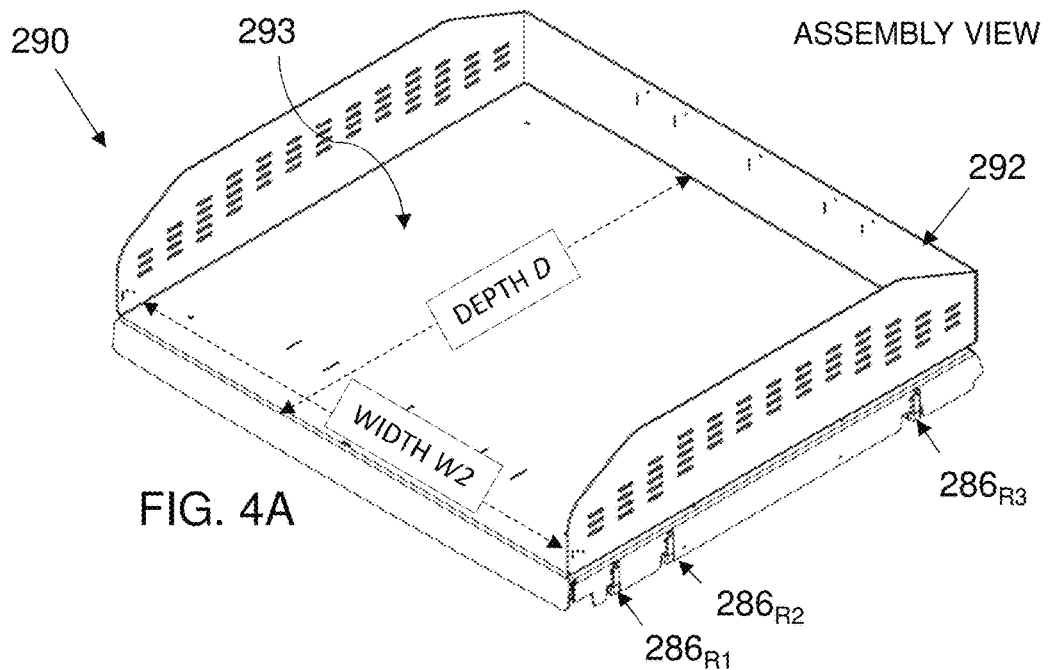
FIGS. 4A and 4B are respective assembled and exploded perspective views of a shelving unit, according to an embodiment of the present invention.
Figure 4B:
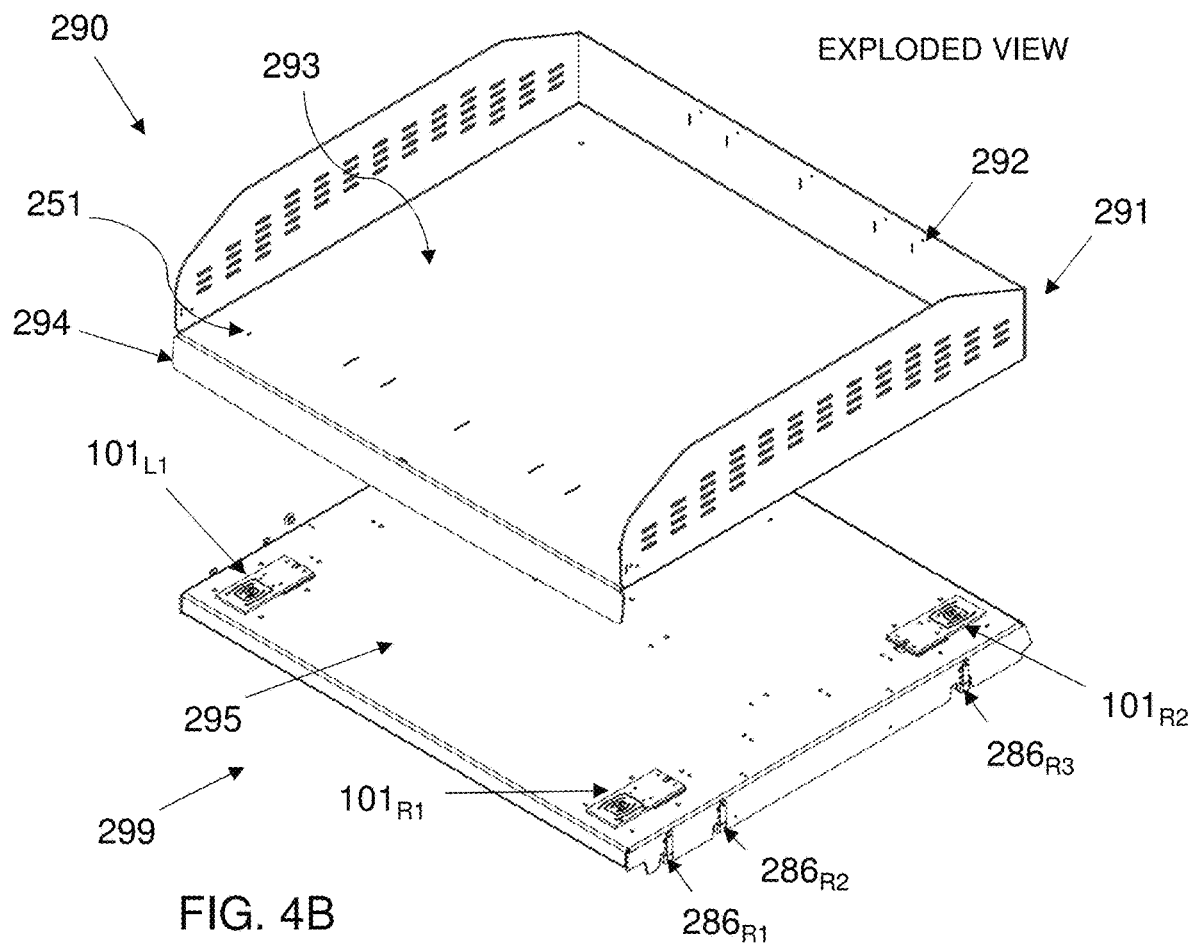

In the exemplary embodiment provided in FIGS. 4A and 4B, first and second flexure arrangements form a flexure arrangement 180, mechanically disposed between loading element 137 and measuring beams or spring elements 107a and 107b.

At least one strain gage, such as strain (or "strain-sensing") gages 120, may be fixedly attached to a surface (typically a top or bottom surface) of each of measuring beams 107a and 107b. Strain gages 120 may be adapted and positioned to measure the strains caused by a force applied to the top of the "free" or "adaptive" side 123 of load cell body 125. When a vertical load acts on free end (i.e., an end unsupported by the base, as shown in FIG. 4) 123 of load cell body 125, load cell body 125 undergoes a slight deflection or distortion, with the bending beams assuming a double-bending configuration having an at least partial, and typically primarily or substantially, double-bending behavior. The distortion is measurably sensed by strain gages 120.

Figures 3A, 3B:
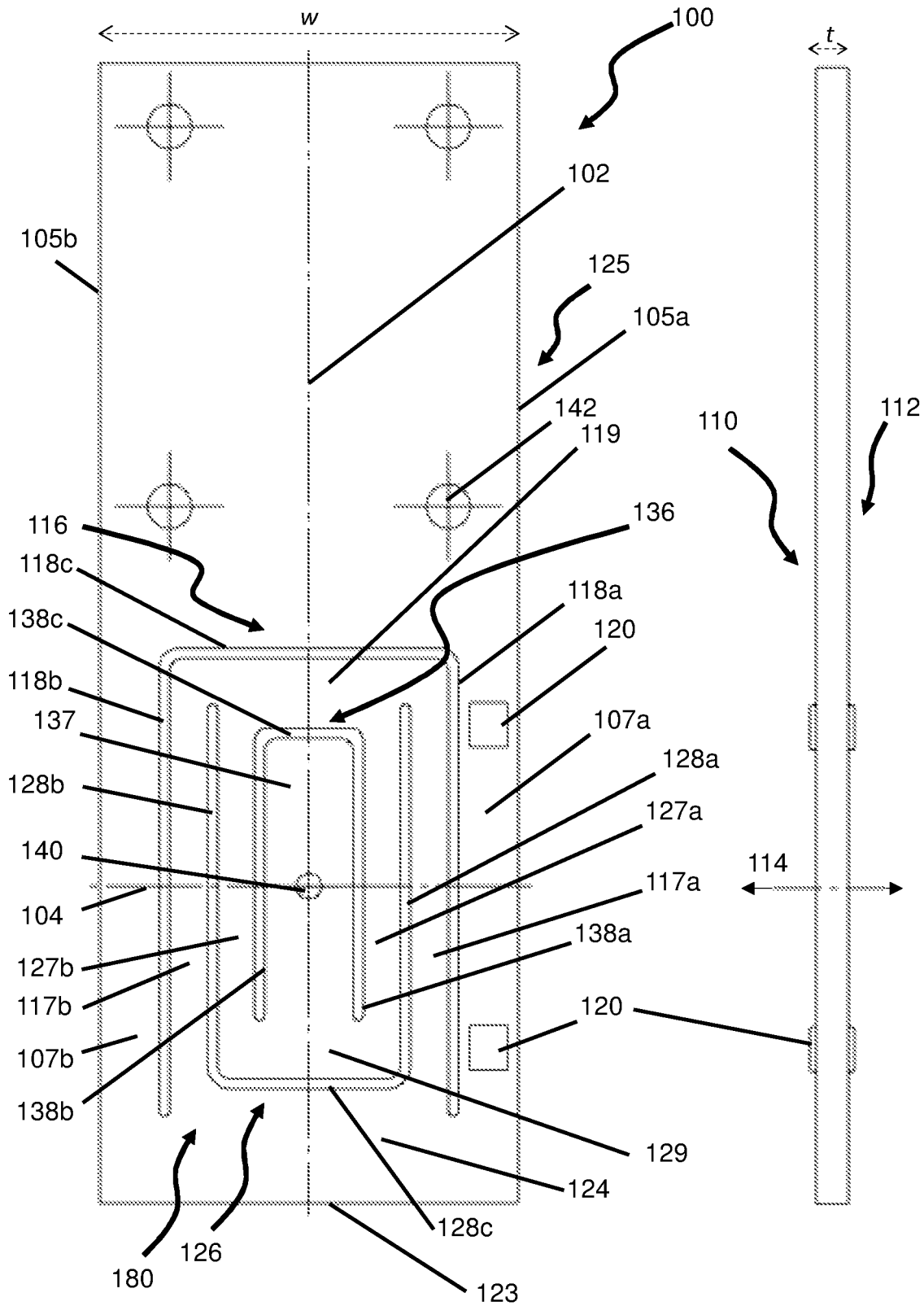
FIGS. 3A and 3B are respectively top and side schematic views of a planar load cell assembly 100, according to an embodiment of the present invention.

It may thus be seen that in the illustrated examples discussed above, load cell assembly 100 is a particular case of a planar load cell assembly, having the load beam and spring arrangement of FIG. 3A. In this case, the number of intermediate flexures is 2, such that m and n both equal zero. In addition, the intermediate flexures are intermediate flexure beam pairs connected by a flexure base. Similarly, the measuring beams are connected at a first end by the fixed end of load cell body 125, and at the opposite end by adaptive end 124 of load cell body 125.

A load cell body 125 may be made from a block of load cell quality metal or alloy. For example, load cell quality aluminum is one conventional and suitable material. In some embodiments, the alloy may advantageously be a magnesium alloy, typically containing at least 85%, at least 90%, and in some cases, at least 92%, at least 95%, or at least 98% magnesium, by weight or by volume. The magnesium alloy should preferably be selected to have an elastic module (E) that is lower, and preferably, significantly lower, than that of aluminum.

In some embodiments, it can be desirable to employ a planar load cell assembly as disclosed herein with a 'high' ratio of width to thickness, where 'width' is the dimension across a plan view of the planar load cell assembly, for example the dimension indicated by the arrow marked with w in FIG. 4A, and thickness is the dimension across a side view, for example the dimension indicated by the arrow marked with t in FIG. 4B. Although the figures attached herewith are not necessarily drawn to scale, the exemplary load cell assembly of FIGS. 4A and 4B can be seen to have a width-to-thickness ratio of more than 10. In some embodiments, the 'high' width-to-thickness ratio can be more than 2, more than 3, more than 5, or more than 10. In other embodiments, any type of load cell can be used.

It should be noted that with respect to embodiments disclosed herein in which it is indicated that a load cell assembly is anchored so as to be attached at least indirectly to a load cell base (which in an assembled configuration is below the load cell assembly), such an arrangement represents a non-limiting example cited for convenience, and in any such embodiment a load cell assembly can alternatively be anchored so as to be attached to a shelf or shelf tray (which in an assembly configuration is above the load cell assembly). These two structural options can provide the same functionality of providing shelf assemblies and shelving units with built-in weighing capabilities.

Shelf Assembly Embodiments

Figure 6A:
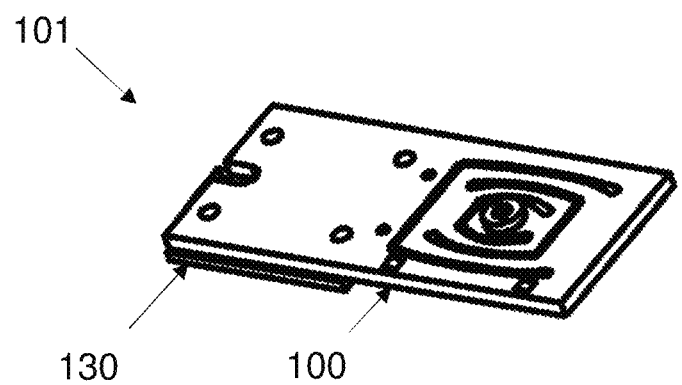
FIG. 6A is a perspective view of a load cell installation assembly 101 according to embodiments.
Figure 6B:
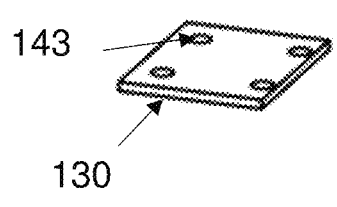
FIG. 6B is a perspective view of a prior art shim element.
Figure 6C:
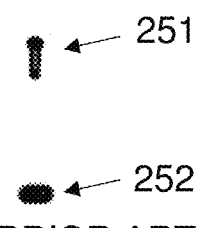
FIG. 6C shows a protruding element and receiving element according to the prior art.
Figure 6D:
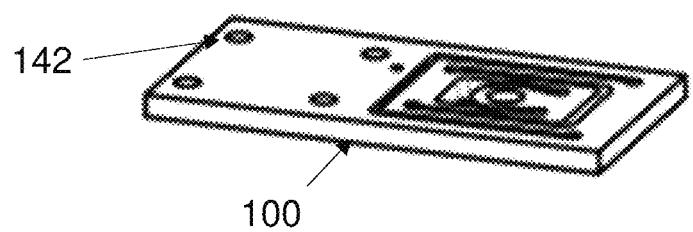
FIG. 6D is a perspective view of a load cell assembly 100 according to embodiments.

Referring now to FIGS. 4A and 4B, an example of a shelf assembly 290 according to an embodiment is shown in both assembled and exploded views. A shelf assembly 290 comprises a weighing base 299 and a shelf or shelf tray 291. The weighing base 299 can comprise a shelf base 295 and a plurality of load cell installation assemblies 101. In this example four load cell installation assemblies $101_{L1}$, $101_{L2}$ (not shown, blocked by shelf tray 291), $101_{R1}$, $101_{R2}$ are provided, but a higher or lower number of load cell installation assemblies can be provided while meeting the design goal of providing accurate weight indications of products 70 on a shelf assembly 290 or added thereto or removed therefrom. As shown in FIG. 6A, a load cell installation assembly comprises a planar load cells 100 and a shim (adapter plate) 130. Mounting holes 142 (FIG. 6D) are provided in load cell assembly 100, which line up with similarly-spaced shim holes 143 (FIG. 6B). Thus, load cell assemblies 100 can be attached (by screw or rivet or any other appropriate attaching method) to a respective shim 130, and, in this way, complete the installation of the load cell installation assemblies on the weighing base 299.

Referring again to FIGS. 4A and 4B, the shelf tray 291 can include a receiving bracket (not shown) for securing and stabilizing a shelf tray 291 on a weighing base 299. In some embodiments a shelf tray 291 can be attached in other ways to a weighing bracket 299. A plurality of prior-art protruding elements 251 (FIG. 6C) and a plurality of joining elements 252 (also FIG. 6C) vertically aligned with respective protruding elements 251 for receiving the respective protruding elements 251 can be provided for transferring load to the load cell assemblies 100. It should be noted that the number of respective protruding elements 251 and joining elements 252 will be the same as the number of load cell assemblies 100 for any given shelf assembly 290. For, example, in the non-limiting example shown in FIG. 4B, the number of load cell assemblies 100 (of load cell installation assemblies 101) is four, and thus four respective protruding elements 251 and four joining elements 252 are used.

Figure 4C:
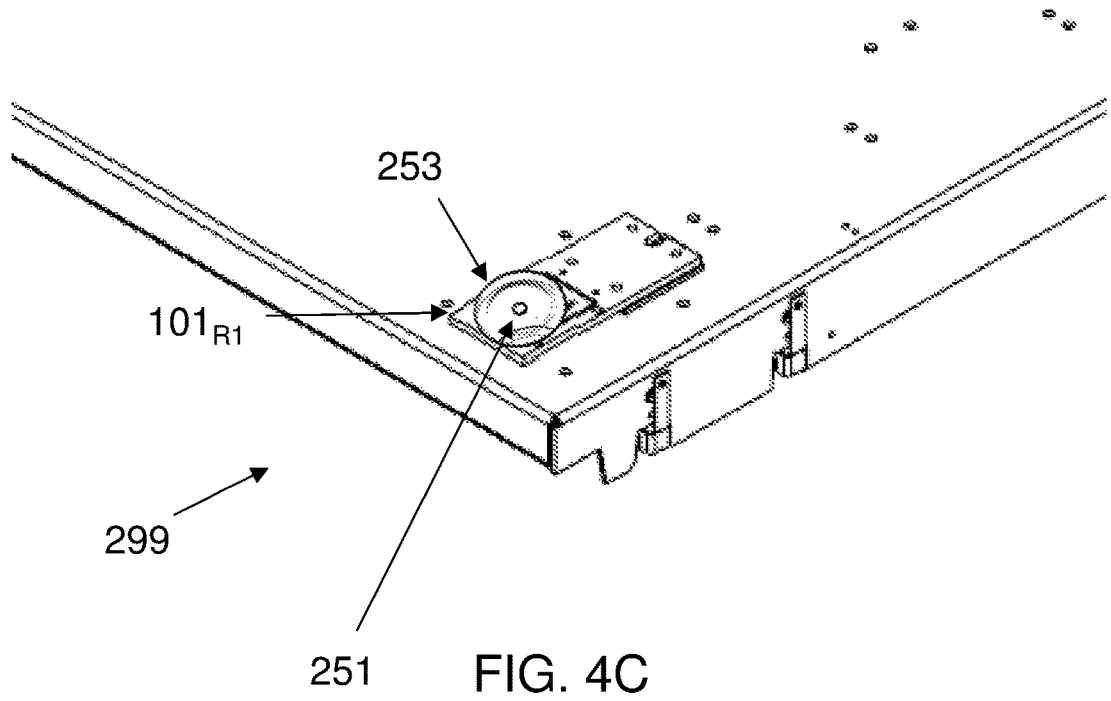
FIG. 4C shows a detail of the weighing base 299 of the shelf assembly 290 of FIG. 4B, according to an embodiment of the present invention.
Figure 4D:
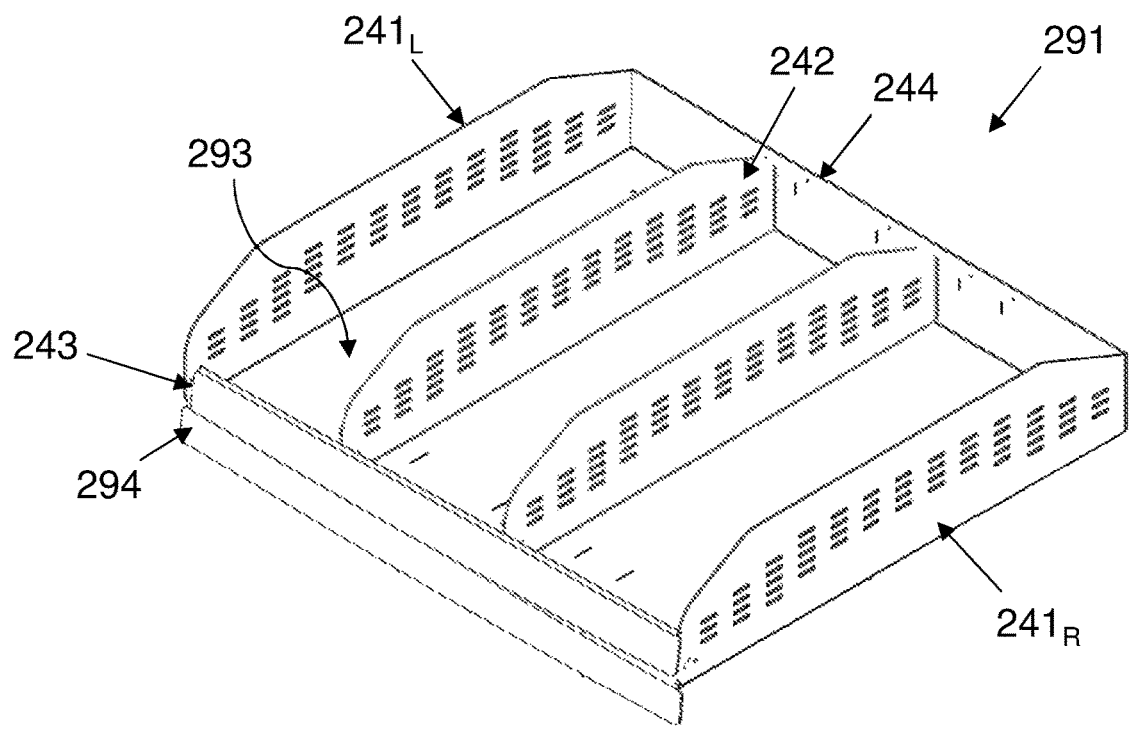
FIG. 4D shows a shelf tray 291 having peripheral and dividing walls according to an embodiment of the present invention.

As mentioned in the preceding paragraph, the protruding elements 251 together with the joining elements 252, can function to transfer load (the weight of the shelf tray 291 and of products 70 displayed thereupon) to the load cell assemblies 100. In some embodiments the protruding elements 251 can transfer the load directly by having a lower end positioned in a receptacle in the load cell assembly 100, and in other embodiments the protruding elements function to ensure the positioning of the joining elements 252 around the holes 140 (in FIG. 3A) on the load cell assemblies 100 so as to transfer the load to the load cell assemblies 100 via the joining elements 252. They can also function to inhibit movement of the aforementioned receiving bracket (not shown) or of the shelf tray 291 in the horizontal plane, for example by being installed in or through the holes 140 in respective load cell assemblies 100. In some embodiments, protruding elements 251 and joining elements 252 can be threaded (e.g., a threaded bolt and respective nut) and in other embodiments they can be unthreaded (e.g., a simple bolt and respective washer). In some embodiments both a threaded nut and a washer may be provided. A protruding element 251 can be deployed in any one of a number of approaches. For example, a protruding element 251 can be disposed on a receiving bracket. As another example, a protruding element 251 can be disposed on joining element 252. As yet another example, a protruding element 251 can be disposed on the shelf tray 291 (preferably flush with the upper surface of the shelf tray 251), the respective joining element 252 holding it in its place on the shelf tray 291. In another example, illustrated in FIG. 4C, a weight distributor 253 in the form of a button or disk can be provided to transfer load (the weight of the shelf tray 291 and of products 70 displayed thereupon) to joining element 251. In FIG. 4C, at least a circumferential rim (or, in other examples, the entire upper surface) of weight distributor 253 is raised higher than joining element 251 above the face of the load cell installation assembly 101 so that the weight distributor 253 is in contact with the shelf tray 291 when in an assembled state. In some embodiments, weight distributor 253 acts as a spacer to ensure that the height of joining element 251 above the face of the load cell installation assembly 101 stays substantially constant during the life of the shelf assembly 290.

It should be noted that use of the term 'shelf tray' should not be taken to literally mean a tray, e.g., as illustrated in the non-limiting example of FIGS. 4A and 4B wherein shelf tray 291 includes tray rim 292. Front flange 294 of shelf tray 291 is optional and has both aesthetic and functional purposes, e.g., obscuring the shelf base 295, the load cell installation assemblies 101 and the miscellaneous elements that might be provided for attachments. In other embodiments, shelf tray 291 can be flat without a tray rim 292, and if additional structural support is necessary for the shelf tray 291, e.g., to resist twisting or bending, it is possible to apply other engineering solutions for strengthening the structure.

The tray rim 292 of FIGS. 4A and 4B can include one or more of: side walls $241_L$ and $241_R$, and rear wall 244. These rim walls can be provided, for example, with respective spacing, height and even thickness so as to inhibit the leaning of products 70 against a side wall 281 and/or back wall 280 of shelving unit 200, which would tend to transfer a part of the load of a product weight from the shelf tray 291 directly to the shelving unit 200 i.e., not via the load cell installation assemblies 101. For example, a side wall 241 can be provided with a gap of at least 3 mm or at least 5 mm or at least 10 mm between it and the side wall 281 of the shelving unit 200. According to the example, the height of the side wall 241 can be at least 5 cm or at least 8 cm or at least 10 cm, or alternatively at least 20% or at least 40% or at least 50% of the height of products 70 such as, for example, soft drink bottles, stocked nearby on the shelf. The side wall 241, including, for example, corrugation or ribs (not shown), can have, in such an example, a thickness of at least 3 mm or at least 4 mm or at least 5 mm. The skilled artisan will quickly grasp that the proper combination of spacing, height and thickness, including as a function of specific products or types of products will greatly reduce the likelihood that any products 70 lean against a side wall 281 of shelving unit 200. Similarly, front wall 243 can be provided to reduce the likelihood that a product 70 leans against door 220 of the shelving unit 200. In addition, one or more vertical dividing walls 242 can be provided to inhibit products 70 from leaning against each other, to avoid false readings of e.g., weight being removed from a shelf.

Referring once again to FIGS. 4A and 4B, a shelf assembly 290 can comprise attachment arrangements or points 286 which mate with attachment elements 285 of side walls 281 and/or back wall 280 of shelving unit 200. If attachment elements 285 comprise holes or recesses, then attachment points 286 can comprise protruding members such as hooks or knobs or similar, and vice versa—if attachment elements 285 comprise protruding members such as hooks or knobs, then attachment points 286 can comprise corresponding recesses or holes. Shelf assembly 290 preferably extends from left wall $281_L$ to right wall $281_R$ such that attachment points on the two sides can mate with attachment elements 285 or attachment components 289 that are joined to the attachment elements 285. In some embodiments, shelf assembly 290 has a width that is at least 80% or at least 90% or at least 95% of the distance between left wall $281_L$ and right wall $281_R$. According to embodiments, there is only a single shelf assembly 290 at any given height in shelving unit 220.

FIG. 4A indicates a depth D of a shelf assembly 290. To help ensure shelving stability, inter alia, it can be advantageous to ensure that there are attachment arrangements or points 286 in the 50% of depth D nearest the front of a shelf assembly 290, or in the 30% or 25% or 20% or 15% or 10% or 5% of depth D nearest the front of a shelf assembly.

FIG. 4A also indicates a width W2 of a shelf assembly 290. Referring back to FIG. 1, width W1 is an interior width of a shelving unit 200. It may be desirable to provide a shelf assembly, or a plurality of shelf assemblies, that efficiently exploit the interior volume of a shelving unit. Thus, width W2 is at least half of width W1, meaning that there can only be one shelving assembly 200 at any given height of a shelving unit 200. In embodiments, the ratio of W1 to W2 can be greater than 60%, greater than 70%, greater than 80%, greater than 90%, greater than 95% or greater than 99%

Figure 5A:
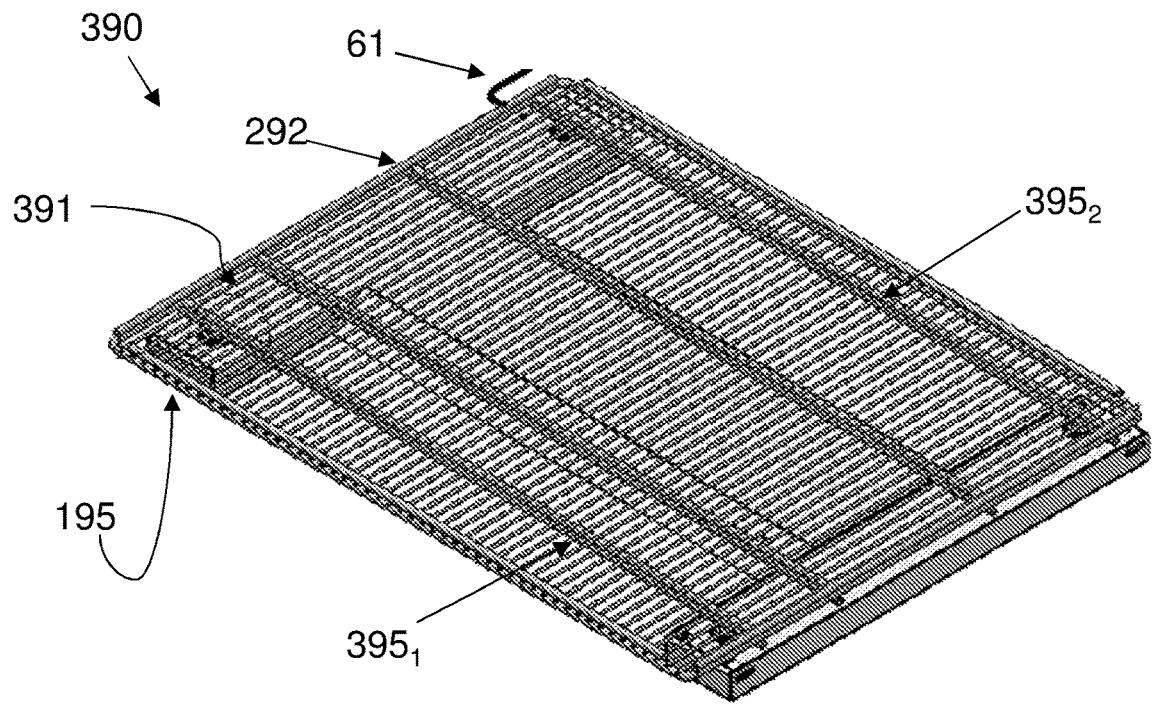
FIG. 5A shows a top-perspective schematic view of a shelf assembly 390 according to embodiments of the present invention.
Figure 5B:
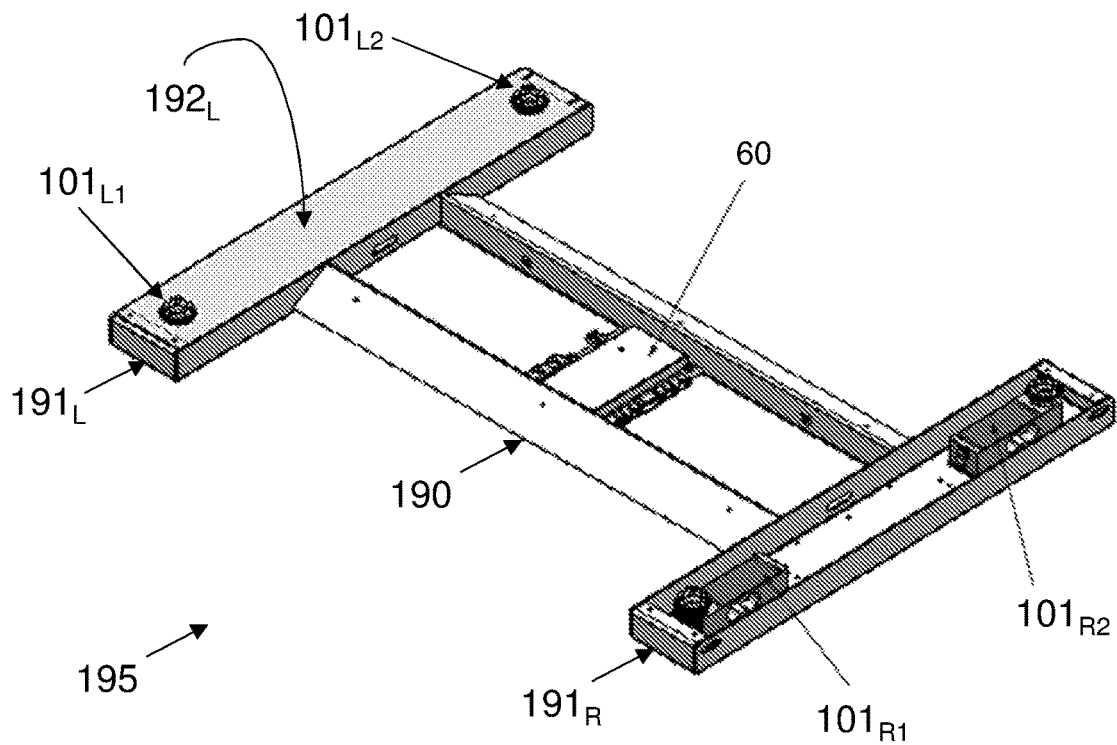
FIG. 5B shows a weighing base 195 of the shelf assembly 390 of FIG. 5A.
Figure 5C:
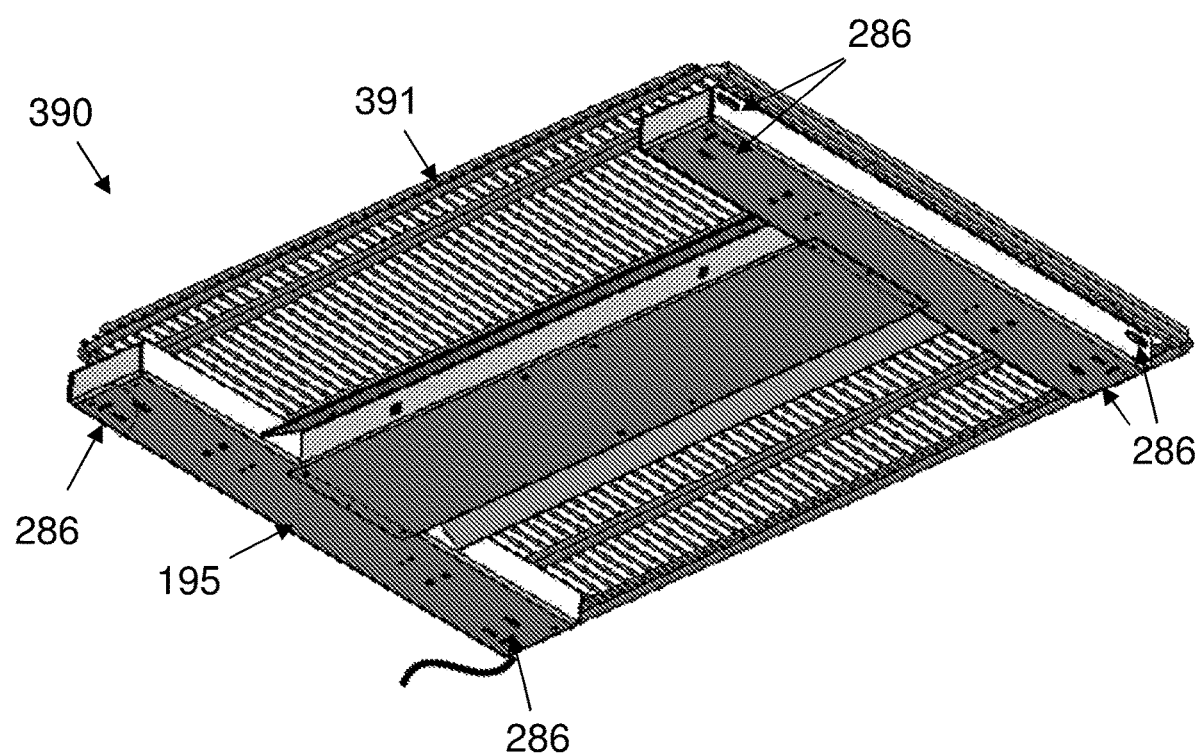
FIG. 5C shows a bottom-perspective schematic view of the shelf assembly 390 of FIG. 5A.

We now refer to FIGS. 5A-C.

A shelf assembly 390 for a refrigerator such as, for example, shelving unit 200 of FIG. 2D, includes a weighing base 195 and a shelf 391. As was described earlier, the shelf 391 can include a peripheral rim 292 to reduce the likelihood that a product leans against the internal wall of the refrigerator 200, which would reduce the force measurable on the shelf 391. Weighing base 195 includes opposing load-cell bases $191_L$, $191_R$ detachedly attachable to respective left and right internal walls of the refrigerator, e.g., according to the attachment options discussed hereinabove with respect to FIGS. 2A-C. As shown in FIG. 5C, the bottom of the weighing base 195 (and therefore the bottom of the shelf assembly 390) includes attachment arrangements 286. Each of the load-cell bases 191 includes a plurality of load cells 101 (of any type, not necessarily planar load cells). Thus, there are at least two load cells 101 on each side, or at least 4 load cells for each weighing base 195. The two load-cell bases 191 are joined to form a rigid, e.g., stable, resistant to twisting, and/or not flexible, frame. A single-member beam 190 is shown as joining the two load-cell bases 191 but any appropriate design and number of left-to-right beams can be used. The beam can be used to support electronic communication arrangements 60, for example transmitted via a communications channel 61, as shown in FIG. 5B. In some embodiments, the load-cell bases 191 and/or the beam are covered with covers 192. It can be desirable for the weighing base 195 to allow at least a minimum amount of vertical airflow to flow freely within the interior of the refrigerator/shelving unit 200, and for this purpose a portion of the horizontal surface of the weighing base 195 can be 'open' to a vertical airflow, the term 'vertical' meaning any airflow within the refrigerator, which in many implementations is vertical or predominantly vertical, e.g., within ±10° of vertical, or within ±20° of vertical, or within ±30° of vertical, or within ±40° of vertical, or within ±45° of vertical. Preferably, at least 25% of the horizontal surface area of the weighing base 195 to vertical airflow, or at least 30%, or at least 35%, or at least 40%, or at least 45%, or at least 50%. In some embodiments, as much as 80% or as much as 70% or as much as 60% of the horizontal surface area of the weighing base 195 can be open to vertical airflow.

The horizontal area of the shelf 391 is also at least partly open to vertical airflow. In embodiments, the horizontal surface area of the shelf 391 can be at least 40% open or at least 50% open or at least 60% open or at least 70% open or at least 80% open or at least 90% open. In embodiments, the shelf 391 can utilize a wire grid design. A wire grid design is mostly open, and airflow passing through the open horizontal areas of the weighing base 195 is not be substantially blocked by the wires of the grid, which generally create minor turbulence as the air passes therethrough without a substantial pressure drop. In some embodiments, a wire-grid shelf can include both thinner wires, e.g., front-to-back wires deployed across the shelf 391 for supporting products, and thicker wires, e.g., left-to-right wires for structural support. As shown in FIG. 5A, left-to-right wires 395 are spaced so as to transmit force, e.g., the weight of the shelf and of products displayed thereupon, to the load cells assemblies 101 in the load-cell bases 191. Thus, the load cell assemblies 101 mediate between the weighing base 195 and the shelf 391, and the shelf 391 does not sit directly on the weighing base 195 or on the cover 192. The left-to-right wires 395 are illustrated in FIG. 5B as being thicker than the front-to-back wires, but in other examples they can all be the same thickness and weight. The skilled artisan will understand that a selection criterion for the left-to-right wires is sufficient rigidity, e.g., resistance to twisting, sagging, etc.

Figure 7:
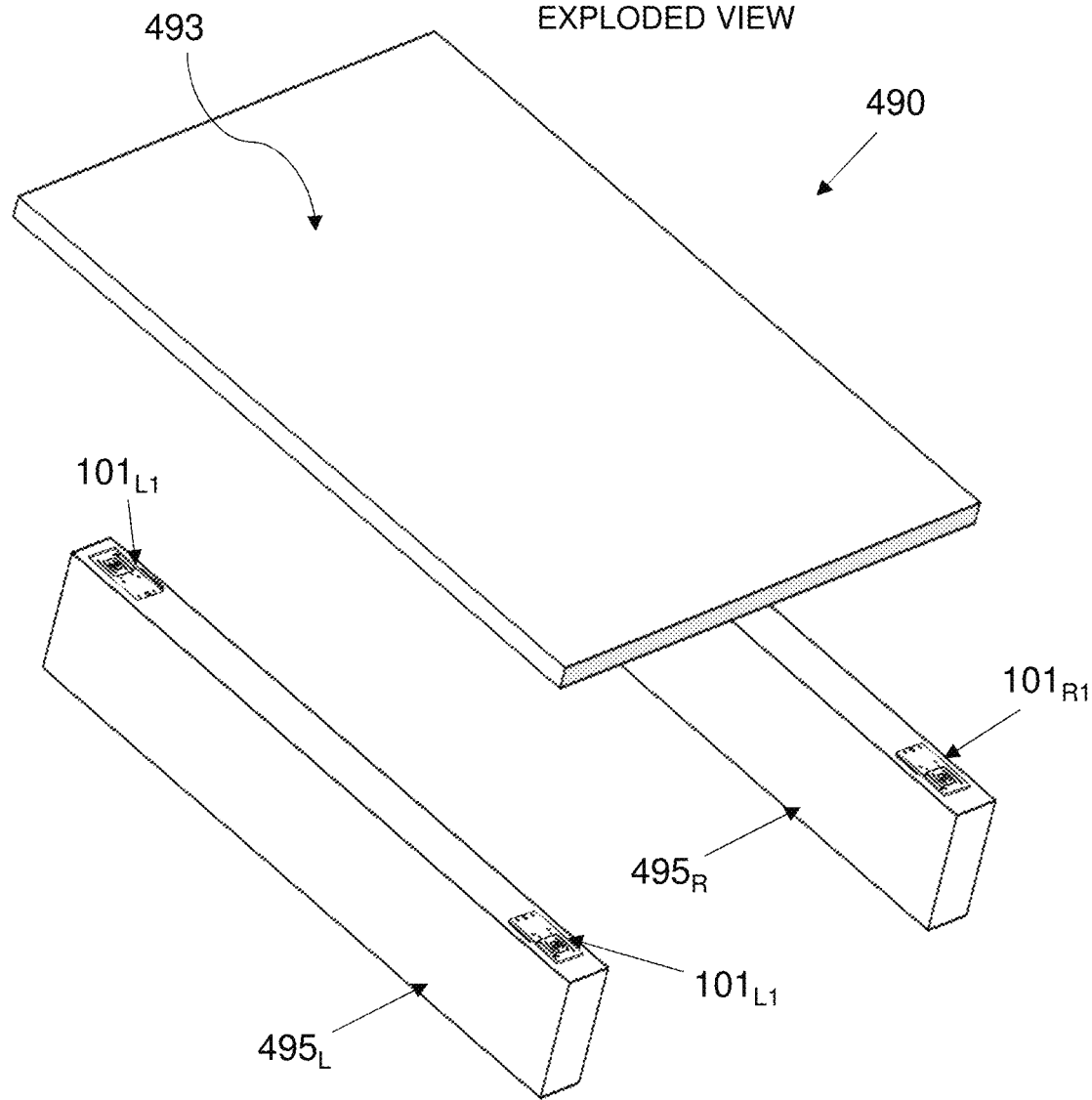
FIG. 7 is a schematic perspective view of a shelf assembly according to an alternative embodiment.
Figure 8:
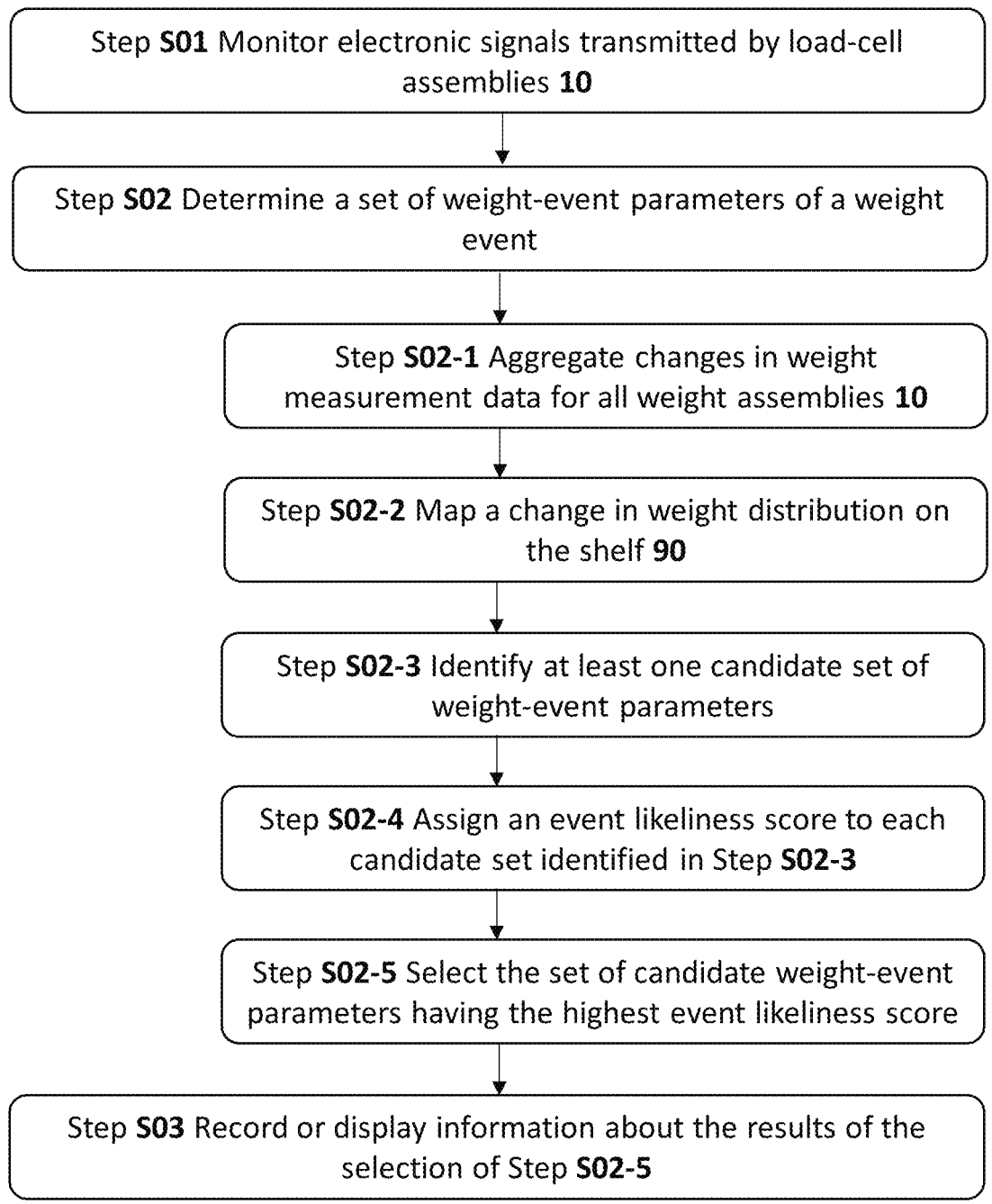
FIG. 8 shows a flowchart of a method for tracking non-homogeneous products on a shelf, according to embodiments of the present invention.

Reference is now made to FIG. 7, in which an alternative embodiment of a shelf assembly 490 is shown. Respective left and right weighing bars $495_L$, $495_R$ are provided as fixed attachments to left and right side-walls $281_L$, $281_R$ of shelving unit 200. Obviously, there can be multiple pairs of weighing bars provided in a single shelving unit 200—one for each shelf assembly 490 desired to be installed in the shelving unit 200. Each weighing bar comprises a pair of load cell installation assemblies 101. The shelf assembly 490 further comprises a shelf tray 493, which can be attached to the respective left and right weighing bars $495_L$, $495_R$ by a receiving bracket (now shown) or by other fastening methods known in the art. Protruding elements 251 and receiving elements 252 can be used here in the same manner as in the embodiment illustrated in FIGS. 4A and 4B.

The embodiments illustrated in FIGS. 4A and 4B, in FIGS. 5A-C, and in FIG. 7 are three diverse examples of weighing-enabled shelving units and shelf assemblies and do not exhaust the possibilities of a retail display and sales system employing load cells. For example, in other embodiments (not illustrated), weighing bars can be deployed in a direction that is orthogonal to the direction of the weighing bars 495 in FIG. 7, such that they each extend from the left wall of a shelving unit to the right wall, one such 'transverse' weighing bar proximate to the back wall and secured either to the back wall or to the two side walls, and the other 'transverse' weighing bar proximate to the front of the shelf assembly 490 and secured at both ends to the two side walls.

Methods for tracking non-homogeneous products on a shelf can use a plurality of weighing assemblies that are jointly operable to measure the combined weight of the shelf and of the products arranged thereupon. In an example, a method comprises: (a) monitoring weight measurement data corresponding to the weight of the shelf and the products arranged thereupon, said weight measurement data measured by the plurality of weighing assemblies and transmitted therefrom as respective streams of weight measurement data points; (b) responsively to a change over time in the values of said weight measurement data, determining a set of weight-event parameters of a weight event, the set of weight-event parameters comprising a product identification and an action taken with respect to the product, the determining comprising: (i) aggregating, across all of the streams, changes in said weight measurement data corresponding to a specific time, (ii) mapping a change in weight distribution on the shelf, using the aggregated changes in weight measurement data, and (iii) assigning a set of weight-event parameters for resolving the mapped change in weight distribution, using product-weight data retrieved from a product database; and (c) performing at least one of: (i) recording information about the results of the selecting in a non-transient, computer-readable medium, and (ii) displaying information about the results of the selecting on a display device.

In some embodiments, said assigning comprises: (i) identifying at least one candidate set of weight-event parameters for resolving the mapped change in weight distribution, using product-weight data retrieved from a product database, (ii) assigning an event likeliness score to each candidate set of weight-event parameters, and (iii) selecting the set of candidate weight-event parameters having the highest event likeliness score. The determining can use product positioning data from a product positioning plan in at least the identifying. The determining can include calculating a probability in at least the assigning. In some such embodiments, the probability can be calculated using a probability distribution function. In some such embodiments, a parameter of the probability distribution function can be derived using a machine learning algorithm applied to historical weight data for a product. The assigned set of weight-event parameters can include exactly one product and one action, or can include at least one of (i) two or more products and (ii) two or more actions. Said action taken with respect to the product is selected from the group consisting of removing the product from the shelf, adding the product to the shelf, and moving the product from one position on the shelf to another.

A method for tracking non-homogeneous products on a shelf, according to embodiments of the present invention, is now disclosed; a flow chart of the method is shown in FIG. 17. According to the method, a plurality of weighing assemblies 10 is jointly operable to measure the combined weights of the shelf 90 and any and all products 70 arranged thereupon. The method, as shown in the flow chart of FIG. 17, comprises:

Step S01: monitoring electronic signals transmitted by weighing assemblies 10. Each electronic signal is from a different weighing assembly 10, and includes a respective stream of weight measurement data points. The weight measurement data points correspond to the weight of the shelf and the products arranged thereupon and, as mentioned earlier, each point reflects a portion of the total weight that is distributed among all of the weighing assemblies 10. The monitoring of the signals includes assessing the values, for example to detect changes in the weights over time, e.g., a difference between a first weight measurement data point at a first time and a second weight measurement data point at a second time, that can be indicative of an action taken with respect to a product.

Step S02: determining a set of weight-event parameters of a weight event. The determining is carried out in response to a change in values, over time, i.e., from one time point to another (not necessarily a consecutive time point) in weight measurement data. The determining can be carried out in response to such a change in values being greater than a given threshold, or that the absolute value of the change is greater than a given threshold. A weight event is an event in which an action is taken with respect to a product so as to change the weight or weight distribution of products on a shelf. Weight-event parameters include a product identification (or identification of more than one product involved in a single weight event, if appropriate) and an action taken with respect to the identified product (or products). A set of weight-event parameters can include a single product and a single action, or one or more products each associated with one or more actions. The determining can be probabilistic. Uncertainties in carrying out the method can mean that the determining selects the most likely set of weight-event parameters for a weight event. For example, the result of a determining can that that product #1 70₁ being added to a shelf 90 is the 'most likely' explanation for a detected change in weight measurement data, as opposed to product #2 70₂ being added or product #3 being added, both of which can be alternative but ultimately less likely candidates for the determining. The uncertainties can stem from any number of sources, including, for example, inaccuracy of the weighing assemblies or unresolved noise and/or drift in the stream of data points. An additional source of uncertainty can include the time it takes for a measurement made by weighing assembly to stabilize (e.g., as a function of the elasticity of a load cell component or of the shelf itself), combined with a system requirement to resolve the weight-event parameters within a limited amount of time, such that an actual total change in weight might not be captured because of a time constraint or other limitation. Other sources of uncertainty will be enumerated later in this discussion where relevant.

As further shown in the flowchart in FIG. 17, Step S02 includes five sub-steps, as follows:

Step S02-1: aggregating changes in weight measurement data for all weight assemblies 10. As used herein, 'aggregating' has the meaning of 'summing'. As discussed earlier, changes in weight measurement data are aggregated for each specific point in time; the aggregation can be for every point in time in a specific time interval or for all points in time as long as the monitoring of Step S01 continues, or for each determining; or for points in time selected according to a given periodicity or selected randomly; the only requirement is that aggregated data all correspond to a given point in time and therefore the streams are preferably synchronized.

Step S02-2: mapping a change in weight distribution on the shelf 90. A weight of a product placed on the shelf (for example) is distributed to all of the weighing assemblies of a shelf so that the aggregate of the increment in measurements made by all of the weighing assemblies equals the total incremental weight of the product; this step solves for the magnitude and location of the weight of the product placed on the shelf (i.e., or removed from the shelf or moved along the shelf) given the individual weight measurement data of the various weighing assemblies. In some embodiments the mapping can be deterministic, producing a single answer for the magnitude of the weight added/removed/moved and the coordinates of the center of weight of that weight. In other embodiments, the mapping can be probabilistic. For example, instead of mapping to a single weight center (X, Y), the mapping of product weight to x,y coordinates can be considered to have a probabilistic distribution (e.g., a density function). The probabilistic function can take into account, for example, unknowns with regards to the uniformity of the make-up or structure of the shelf, or with regards to possible angular displacement of the shelf from horizontal. It can also take into account inaccuracies in one or more of the weighing assemblies. Using a non-deterministic result out of the mapping sub-step can be another source in uncertainty in the overall determining step. In some embodiments the result of this mapping step can be stored in a repository of weight distribution mappings 51 in computer-readable storage medium 68.

Step S02-3: identifying at least one candidate set of weight-event parameters for the weight event. In this step, product data for reference can be accessed or retrieved from a product database 67 which can include, inter alia, baseline weights for products as well as ranges and distributions of possible and/or historical weights for products. Data for reference can be accessed or retrieved from a product positioning plan 69 (a planogram). The identifying includes matching a weight added/removed/moved ('the event weight') in Step S03-2 with the weight of a product according to data in the product database 67 and/or appearing in the planogram. The matching can return a single deterministic answer or can return an answer consisting of one or more products that may match the event weight, or come close with varying levels of probability. Probability may be assigned according to a wide variety of factors, some of which are illustrated in the following examples:

In an example, two products in the product database both have a weight matching the event weight, but only one of them is in the planogram for the shelf in question. While both products are identified in candidate sets of weight-event parameters, the one appearing in the planogram is assigned a higher probability.

In another example, two products in the product database both have a weight matching the event weight, but they appear in the planogram as belonging on other shelves. One belongs, according to the planogram, on a nearby shelf, while the other appears on a far-away shelf. While both products are identified in candidate sets of weight-event parameters, the one appearing in the planogram on a closer shelf is assigned a higher probability.

In another example, two products appearing in the product database and in the planogram have a weight matching the event weight, and the weight event is an addition to the shelf. The first product was identified with a 'removal' weight-event from the same shelf ten minutes earlier, and the second product was identified with a 'removal' event five minutes earlier. While both products are identified in candidate sets of weight-event parameters, the one identified in a removal weight event five minutes earlier is assigned a higher probability.

In another example, the aggregated change in weight on the shelf was 500 grams. A first product appearing in the planogram for that shelf weighs 50 grams more, according to the product database, and a second product weighs 30 grams less. While both products are identified in candidate sets of weight-event parameters, the product weighing 30 grams less is assigned a higher probability. In another example, the second product weighing 30 grams less 'belongs' on the left side of the shelf according to the planogram and the first product weighing 50 grams more belongs on the right side; according to the mapping of weight distribution in Step S2-02, the weight-center of the weight added or removed was closer to the right side, and the product weighing 50 grams more is assigned a higher probability.

In another example, two products appearing in the product database and in the planogram have a weight matching the event weight, and the weight event is a removal from the shelf. The first product has a sales rate of one can per week, and the second product has a sales rate of five cans per week. While both products are identified in candidate sets of weight-event parameters, the product with the higher sales rate is assigned a higher probability.

In yet another example, two products appearing in the product database and in the planogram have a weight matching the event weight, and the weight event is a removal from the shelf. The first product is 'on sale' this week at a 20% discount, and while both products are identified in candidate sets of weight-event parameters, the product with discount is assigned a higher probability.

In some embodiments, an assigned probability can be calculated using a probability distribution function. A probability distribution function can be pre-programmed based on hypothetical data and/or empirical data. A probability distribution function can be derived using a machine learning algorithm applied to historical weight data for a product.

In an illustrative example, two products appearing in the product database and in the planogram have a weight within three grams on either side of the event weight, and the weight event is a removal from the shelf. Associated with the first of the two product is a history of being 10 grams heavy 20 percent of the time and 5 grams heavy 30 percent of the time. The rest of the time, the product weight is within 2 grams either way of the baseline weight (e.g., the nominal, mean or median weight, or the 'listed' weight in the product database). Associated with the second of the two products is a history of being 10 grams heavy 5 percent of the time and within 3 grams either way of the baseline weight the remainder of the time. A probability distribution function derived using a machine learning algorithm applied to the respective historical weight data (a simplified version of which is presented in the foregoing example) for each of the two products assigns a higher probability to the second product. Nonetheless, both products are identified in candidate sets of weight-event parameters. The skilled artisan will appreciate that the machine learning algorithm selected for deriving probability distribution functions for product weights and calculating probabilities therefrom can be any of those known in the art and suited to the historical product-weight data, such as, for example and non-exhaustively: Linear Regression, Logistic Regression, Decision Tree, SVM, Naive Bayes, kNN, K-Means and Random Forest.

The skilled artisan will appreciate that any of the factors involved in the foregoing examples of assigning probabilities can be combined in any way, along with other intrinsic and extrinsic factors that can affect the assigning of probabilities.

Step S02-4: assigning an event likeliness score to each candidate set identified in Step S02-3. The foregoing discussion with respect to Step S02-3 included assigning probabilities to candidate sets of weight-event parameters, the assigning of an event likeliness score takes other factors into account as well, in addition to the probabilities assigned in Step S02-3. The 'other factors' can include the uncertainties discussed earlier including factors related to the weight measurement data, to noise and drift, to the uncertainty in mapping the weight distribution on the shelf, and so on. Thus, a final event likeliness score is assigned to each candidate set of weight-event parameters, so as to account for all of the uncertainty introduced in the various steps of the method.

Step S02-5: selecting the set of candidate weight-event parameters having the highest event likeliness score assigned in Step S02-4. The result of the 'selecting' in the last sub-step of Step S02 is therefore the result of the 'determining'.

Step S03: recording or displaying information about the results of the selection of Step S02-5. The results of the selecting (i.e., of the determining) can be recorded, for example in the non-transient computer-readable storage medium 68, or in a similar storage medium in another location, for example in the 'cloud', where the results are transmitted via an internet connection. The results, alternatively or additionally, can be displayed on a display device, such as display device 62 or on another display device, which, for purposes of illustration, can be one intended to convey information to a customer of an unattended retail arrangement, or the screen of an inventory clerk in a storage warehouse.

Any of the steps of the method can be carried out by the one or more computer processors 66. In some embodiments, not all of the steps of the method are necessarily carried out. In some embodiments, a system, e.g., the system 100 shown in FIG. 6, can be for tracking non-homogeneous products on a shelf and can comprise a plurality of weighing assemblies 10, one or more computer processors 66, and a computer-readable storage medium 68 containing program instructions 50 which, when executed by the one or more processors 66, can cause the one or more processors 66 to carry out the steps of the foregoing method.

Additional methods for tracking and disambiguating non-homogeneous products are disclosed in co-pending International Patent Application PCT/IB2019/055488, filed on Jun. 28, 2019, and published as WO/2020/003221 on Jan. 2, 2020, which is hereby incorporated by reference for all purposes as if fully set forth herein.

In some embodiments, non-weighing sensors such as, for example, optical sensors or barcode readers, can be used in conjunction with any of the weighing sensors, weighing assemblies and shelf arrangements disclosed herein. Such sensors can be expensive and/or unreliable and/or difficult to maintain or suffer from other disadvantages, and therefore in other embodiments, exclusively weighing sensors are used for disambiguating non-homogeneous products. In such 'weighing-only' embodiments, systems for tracking products on a shelf, or systems for unattended retail sales transactions and/or tracking inventory are devoid of other such sensors, i.e., optical sensors, barcode readers, or manual input devices and the like for identifying specific products or SKU's. In some such embodiments in which solely weighing sensors are used in tracking and disambiguation, environmental sensors such as temperature sensors and noise-detecting sensors may be used in the analysis of streams of weight data points received from weighing assemblies but not directly in the disambiguation of non-homogeneous products. Thus, it can be said that a system or method as disclosed herein uses only weight-related information, or is devoid of non-weighing sensors or of optical sensors, or that the methodology of product identification is independent of optical information (e.g., from such optical sensors), and this does not preclude the use of environmental sensors in analyzing (including, optionally, modifying) streams of data points received from weighing assemblies.

Incorporation in a System

Figure 9A:
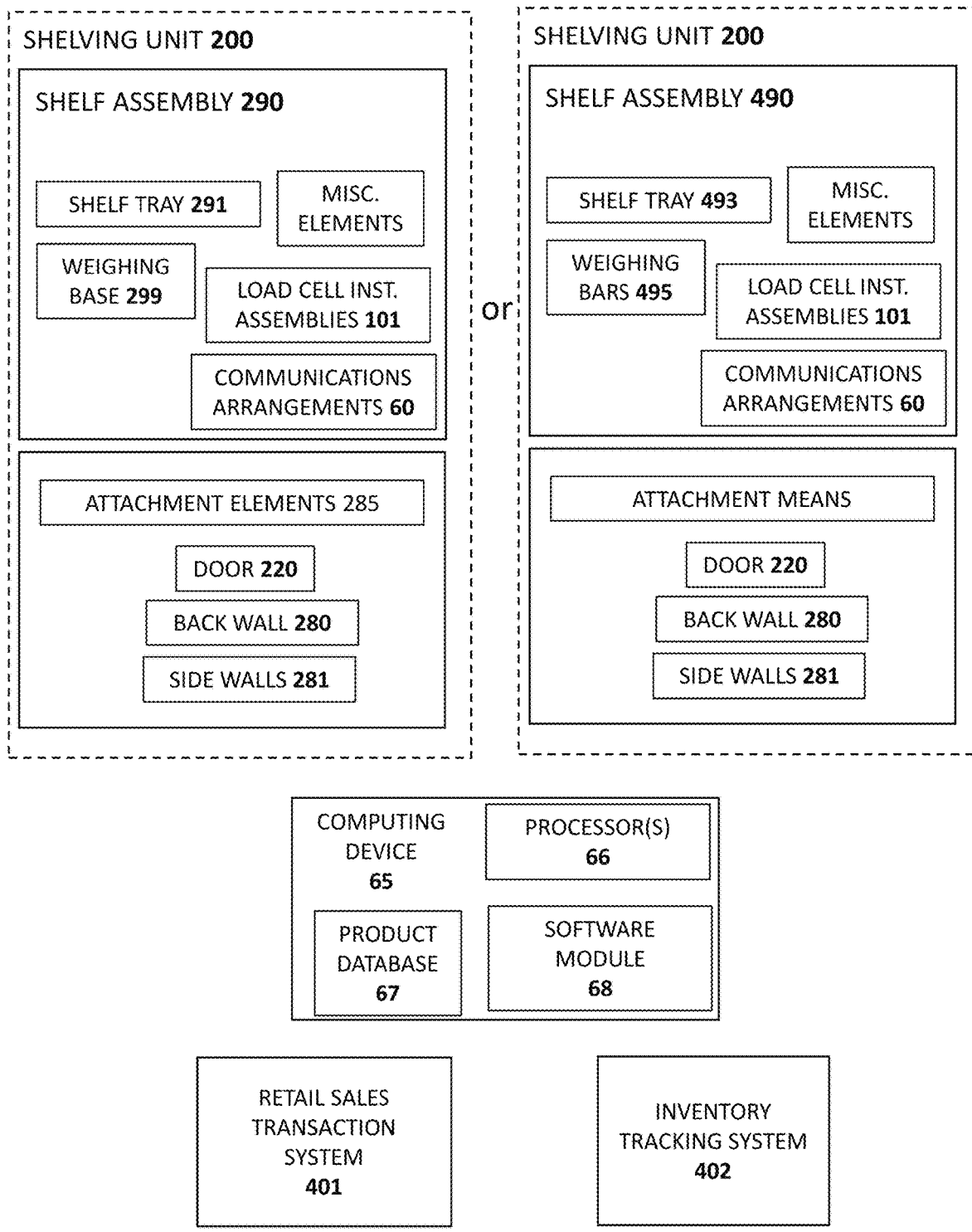
FIGS. 9A and 9B are block diagrams of various shelving units in communication with a computing device and at least one of a retail sales transaction system and an inventory tracking system, according to embodiments.
Figure 9B:
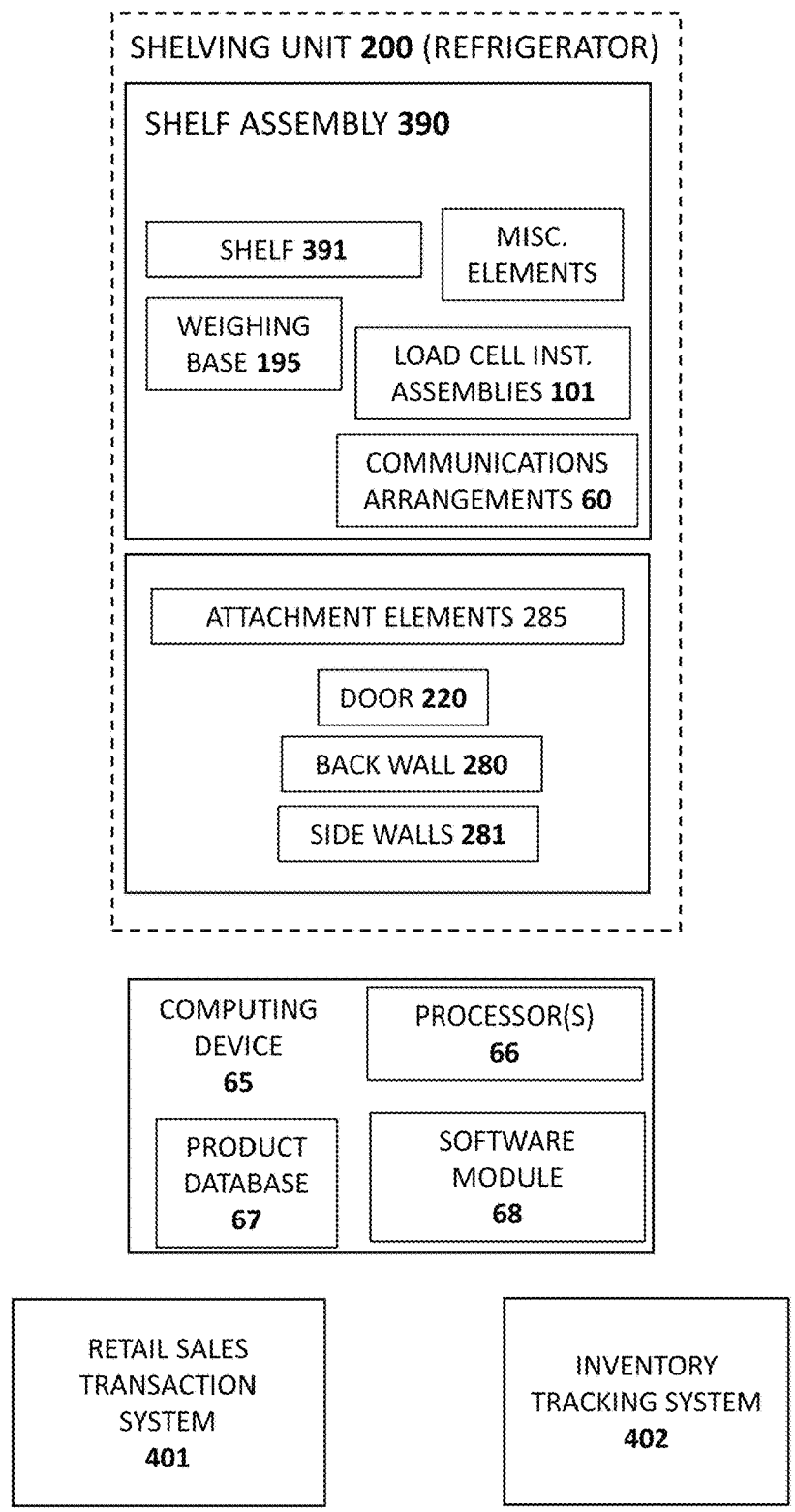

FIGS. 9A and 9B include block diagram showing details of systems for executing unattended retail sales transactions and/or tracking inventory of products, using any of the embodiments of shelving units and shelf assemblies disclosed herein. Such a system includes a shelving unit 200, which can include any of the shelving unit features shown. Each shelving unit includes a number of shelf assemblies 290 (or alternatively, shelf assemblies 490 as discussed above with respect to FIG. 7 or shelf assemblies 390 as discussed above with respect to FIGS. 5A-C).

Each shelf assembly 290 includes shelf tray 291, weighing base 299, load cell installation assemblies 101, communications arrangements 60 by which the processors of load cell assemblies can communicate weight information with other system elements, and miscellaneous mechanical elements.

Each shelf assembly 490 includes shelf tray 493, weighing bars $495_L$ and $495_R$, load cell installation assemblies 101, communications arrangements 60 by which the processors of load cell assemblies can communicate with other system elements, and miscellaneous mechanical elements.

Each shelf assembly 390 includes shelf 391, weighing base 195, load cell installation assemblies 101, communications arrangements 60 by which the processors of load cell assemblies can communicate with other system elements, and miscellaneous mechanical elements. In some embodiments (not shown in FIG. 9B) the shelf assembly can include a weighing-base cover.

Each of the load cell assemblies 100 of load cell installation assemblies 101 can communicate weight information with computing device 65. Once computing device 65 determines that a product has been added to or removed from a shelf, and further determines which specific product has been added to or removed from a shelf, then the information can be forwarded to a retail sales transaction system 401 and or an inventory tracking system 402.

It will be appreciated by those of skill in the art that not all of the elements in the block diagram in FIG. 9 need be present in order to practice the invention.

Figure 10:
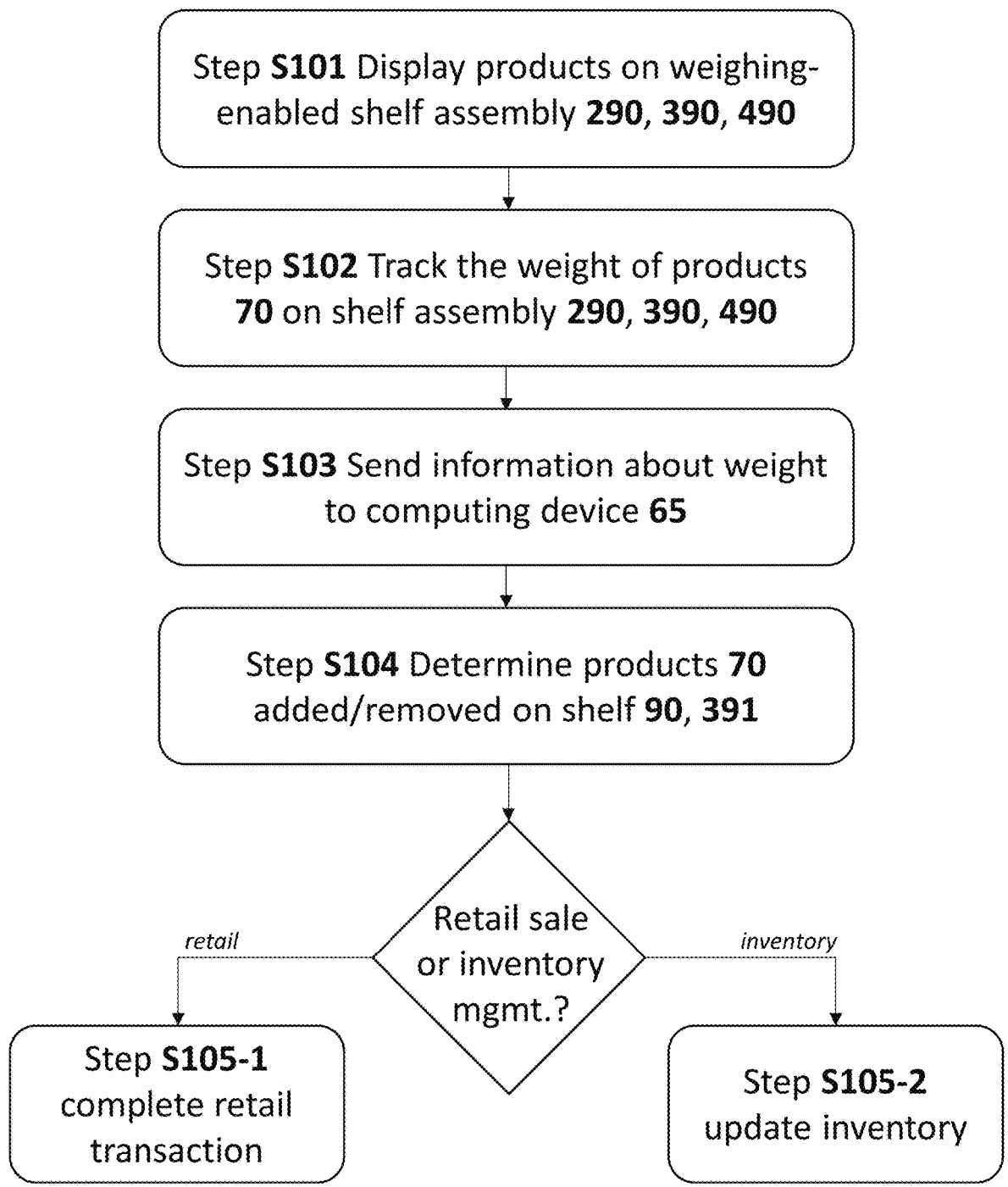
FIG. 10 shows a flowchart of a method for using weighing-enabled shelving units to perform retail transactions and/or inventory management.

Referring now to FIG. 10, a method is disclosed for executing unattended retail sales transactions and/or tracking inventory of products, using any of the embodiments of weighing assemblies and shelving arrangements disclosed herein. According to embodiments, the method includes:

Step S101 displaying products 70 on weighing-enabled shelf assemblies 290, 390, 490 according to any of the embodiments disclosed herein. Products need not be homogeneous, as in later step S104 a determination will be made as to which products are added and or removed on a shelf.

Step S102 tracking the weight of products 70 on shelf assemblies 290, using the load cell assemblies 100 installed in the load cell installation assemblies of each shelf assembly.

Step S103 sending information about the weight of products 70 to the computing device 65. This includes communication of information about weight indications from the processors of the load cell assemblies 100 via a communications channel 61.

Step S104 determining which products 70 were added to or removed from a shelf 90, 391.

Decision Step D1 as to whether the information is to be used in a retail sale transaction or for inventory management, or for both. The result of the decision is of course known and included in the computer code of the system.

Step S105-1 complete retail transaction if that is a result of Decision Step D1.

Step S105-2 update an inventory entry if that is a result of Decision Step D1.

Not all of the steps of the method need be carried out in order to practice the invention.

Additional Discussion

In embodiments, a shelving unit, for enabling a retail transaction for the sale of products from the shelving unit, comprises: (a) a weighing-enabled shelf assembly comprising: (i) a base unit comprising at least one and typically a plurality of load cell assemblies; and (ii) a shelf unit disposed atop the base unit, the base unit being configured to receive the weight load of the shelf unit and distribute it among the plurality of load cell assemblies; and (b) a shelving unit housing surrounding the shelf assembly, typically on at least three sides to form an enclosure, wherein the width of the shelf assembly is more than half the interior width of the enclosure such that for any given height of the enclosure there is no more than one shelf assembly.

In some embodiments, the shelving unit can additionally comprise: (c) one or more computer processors in electronic communication with at least one of the plurality of load cells; (d) a non-transitory computer-readable storage medium on which are stored program instructions, which when executed cause the one or more processors to perform the following steps: (i) tracking the weight of products borne by the shelf unit, using the plurality of load cell assemblies; (ii) calculating a change in weight of the products on the shelf; and (iii) in response to the calculating: (1) determining that a product has been added to or removed from the shelf unit, and (2) in response to the determining that a product has been added to or removed from the shelf unit, further determining a product-specific identifier of the added or removed product; and (iii) completing a retail sales transaction, using the result of the determining and of the further determining.

In some embodiments, the width of the shelf assembly is greater than 90% of the interior width of the enclosure.

In some embodiments, the shelving unit additionally comprises a retail transaction apparatus.

In embodiments, a shelving unit having weighing capabilities comprises at least a first shelf assembly, each shelf assembly including: (i) a shelf, (ii) a plurality of load cell assemblies, each load cell assembly of the plurality including: (A) a load cell body having a free end and an anchored portion, the load cell body including a spring element and at least one receiving element; and (B) a strain-sensing gage, bonded to the spring element, the strain-sensing gage adapted to measure a strain in the spring element, in the loaded disposition; and (iii) a load cell base, wherein, in a weighing configuration, (i) the plurality of load cell assemblies are adapted to receive a vertical load from the shelf, and (ii) the receiving element has an unloaded disposition and a loaded disposition in which the at least one receiving element receives the vertical load, wherein in the loaded position, the free end attains a depressed position with respect to the free end in the unloaded disposition.

In some embodiments, the shelving unit can also comprise (b) a shelving unit housing forming a shelving volume horizontally bounded by left and right walls. In some such embodiments, the shelving volume can be additionally bounded by a back wall. In some embodiments, the shelving volume can additionally be bounded by a door in the front.

In some embodiments, the shelving unit can also comprise: (c) at least a first attachment element, attached to the left wall, and at least a second attachment element, attached to the right wall, wherein the at least first and at least second attachment elements effect securement of the shelf assembly to the left and right walls. In some embodiments, the shelving unit can also comprise at least a first attachment element attached to the back wall.

In some embodiments, the shelf has a depth D defined as a minimum distance from a front edge to a back edge of the shelf, the back edge facing the back wall, wherein the securement may be effected within a distance of 0.50·D from the front edge. In some embodiments, the securement may be effected within a distance of 0.30·D, 0.25·D, 0.20·D, 0.15·D, or 0.10·D from the front edge.

In some embodiments, each shelf assembly can additionally comprise at least one protruding element, wherein the at least one protruding element is vertically aligned with the at least one receiving element, whereby, in the loaded disposition, the at least one receiving element receives the vertical load via the at least one protruding element. The at least one protruding element can be disposed on the shelf.

In some embodiments, the shelving unit can further comprise an attachment component for securing the shelf assembly to the attachment element, wherein the securing includes attaching the attachment component to an attachment-element-point of the attachment element and mating the attachment component to an attachment point of the shelf assembly.

In some embodiments, the attachment elements can be adapted for multiple non-destructively reversible securements.

In some embodiments, the securement of the shelf assembly to the left and right walls can include securement of the load cell base to the left and right walls.

In some embodiments, the shelf assembly can comprise a plurality of load cell bases, wherein the attachment of the shelf assembly to the left and right walls is by attachment of at least one load cell base to each of the left and right walls. The attachment elements can be adapted for fixed attachment of the load cell bases.

In some embodiments, the shelving unit can additionally comprise a retail transaction apparatus. In some embodiments, the shelving unit can additionally comprise a door that includes an electronically engageable lock. In some embodiments, the load cell assembly can comprise a load cell. In some embodiments, the load cell assembly can comprise a double ended load cell. In some embodiments, the load cell assembly can comprise a load cell having a flexural member. In some embodiments, the flexural member can be is an integral portion of the load cell body.

In some embodiments, the strain-sensing gage can be being associated with a processing unit configured to receive strain signals therefrom, and to produce a weight indication based on the strain signals. The shelving unit can additionally comprise a communications arrangement for sending information about the weight indication to a computing device. The shelving unit can additionally comprise the computing device, wherein the computing device includes a software module for determining, based on the information, that a product has been added to or removed from a shelf. The product can be a member of a group of products characterized by a plurality of SKU-identifiers, and the determining by the software module can additionally include determining the SKU-identifier of the product that has been added or removed from the shelf. The result of the determining by the software module can be further used to perform at least one of a retail sales transaction and an inventory adjustment in a computerized inventory system.

In some embodiments, the shelving unit can additionally comprise a refrigeration unit. In some embodiments, each of the attachment elements can include at least one attachment-element-point adapted for mating with corresponding attachment points of a shelf assembly. In some embodiments, each shelf assembly can have exactly one respective load cell base, each one respective load cell base supporting all of the plurality of load cell assemblies of the respective shelf assembly.

In some embodiments, the plurality of load cell assemblies of the shelf assembly can consist of 4 load cell assemblies. In some embodiments, each shelf assembly can extend substantially from the left wall to the right wall.

In embodiments, a shelving unit comprises a shelf assembly that includes (i) a shelf and (ii) securement arrangements for fixing the position of the shelf assembly in a shelving unit, the shelf assembly having a left side facing a left wall of the shelving unit and a right side facing a right wall of the shelving unit, wherein the shelf assembly includes: (a) a planar load cell assembly comprising at least one load cell arrangement disposed on a single metal load cell body, the load cell body having a primary axis, a central longitudinal axis, and a transverse axis disposed transversely with respect to the primary and central longitudinal axes, a broad dimension of the load cell body being disposed along the primary axis, the load cell body having rectangular faces, each load cell arrangement including: (i) a first contiguous cutout window passing through the broad dimension and formed by a first pair of cutout lines disposed parallel to the central longitudinal axis, and connected by a first cutout base; (ii) a second contiguous cutout window passing through the broad dimension and formed by a second pair of cutout lines disposed parallel to the central longitudinal axis, and connected by a second cutout base; and (iii) a third contiguous cutout window passing through the broad dimension and formed by a third pair of cutout lines disposed parallel to the central longitudinal axis, and connected by a third cutout base, wherein the second contiguous cutout window is transversely bounded by the first contiguous cutout window, and the third contiguous cutout window is transversely bounded by the second contiguous cutout window; and wherein the second cutout base is disposed diametrically opposite both the first cutout base and the third cutout base. Each load cell arrangement additionally includes (iv) a pair of measuring beams, disposed along opposite edges of the load cell body, and parallel to the central longitudinal axis, each of the measuring beams longitudinally defined by a respective cutout line of the first pair of cutout lines; (v) a first flexure arrangement having a first pair of flexure beams, disposed along opposite sides of the central longitudinal axis, and parallel thereto, the first pair of flexure beams longitudinally disposed between the first pair of cutout lines and the second pair of cutout lines, and mechanically connected by a first flexure base; (vi) a second flexure arrangement having a second pair of flexure beams, disposed along opposite sides of the central longitudinal axis, and parallel thereto, the second pair of flexure beams longitudinally disposed between the second pair of cutout lines and the third pair of cutout lines, and mechanically connected by a second flexure base; (vii) a loading element, longitudinally defined by the third pair of cutout lines, and extending from the second flexure base, the transverse axis passing through the loading element; and (viii) at least one strain gage, fixedly attached to a surface of a measuring beam of the measuring beams. The shelf assembly additionally includes a load cell base including the securement arrangements and attached to the load cell body at an anchored end thereof, wherein at least one of the securement arrangements is on the left side of the shelf assembly and at least one of the securement arrangements is on the right side of the shelf assembly.

In some embodiments, the shelf assembly can additionally comprise at least one protruding element, wherein, in an assembled configuration, the at least one protruding element is vertically aligned with the at least one receiving element. The at least one protruding element can be disposed on the shelf.

In some embodiments, the securement arrangements can include attachment points adapted for mating with one of: (i) an attachment-element-point of a shelving unit wall and (ii) an attachment component of a shelving unit. An attachment point can include at least one of a protruding member, a recess, a hole and a slot. The shelf assembly has a depth D defined as a minimum distance from a front edge to a back edge of the shelf, the back edge facing the back wall, and at least one of the securement arrangements may be disposed within a distance of 0.50·D from the front edge. At least one of the securement arrangements may be disposed within a distance of 0.30·D, 0.25·D, 0.20·D, 0.15·D, or 0.10·D from the front edge. The attachment points can be adapted for multiple non-destructively reversible securements.

In some embodiments, the securement of the shelf assembly to the left and right walls can be by securement of a load cell base to the left and right walls.

In some embodiments, the shelf assembly can comprise a plurality of load cell bases, wherein the attachment of the shelf assembly to the left and right walls is by attachment of at least one load cell base to each of the left and right walls. The attachment points can be adapted for fixed securement of the load cell bases.

In embodiments, a shelf assembly with weighing capabilities comprises (a) a shelf; (b) securement arrangements adapted for securing the shelf assembly to a shelving unit; and (c) a load cell assembly including: (i) a load cell body having a free end and an anchored portion, the load body including a spring element and at least one receiving element adapted to receive a vertical load from the receiving bracket, the receiving element having an unloaded disposition and a loaded disposition in which the free end is depressed with respect to the free end in the unloaded disposition; and (ii) a strain-sensing gage, bonded to the spring element, the strain-sensing gage adapted to measure a strain in the spring element, in the loaded disposition. The shelf assembly also comprises (d) a load cell base including the securement arrangements, the load cell base attached to the load cell body at the anchored portion thereof.

In some embodiments, it can be that (i) at least one of the securement arrangements is on a left side of the shelf assembly so as to face, in an assembled configuration, a left wall of the shelving unit, and (ii) at least one of the securement arrangements is on a right side of the shelf assembly so as to face, in an assembled configuration, a right wall of the shelving unit.

In embodiments, a method, of tracking inventory of products displayed on shelving comprising weighing assemblies, comprises: (a) storing products characterized by a plurality of SKU-identifiers on a shelf assembly with weighing capabilities, the shelf assembly comprising a load cell assembly including (i) a load cell body having a free end and an anchored portion, the load cell body including a spring element and at least one receiving element, (ii) a strain-sensing gage, bonded to the spring element, the strain-sensing gage adapted to measure a strain in the spring element, in the loaded disposition, and (iii) a load cell base including securement arrangements for attaching the shelf assembly to a shelving unit; (b) tracking the weight of the products on the shelf, using the load cell assembly; (c) in response to a change in weight of the products on the shelf, sending information about the weight of the products from the load cell assembly to a computing device; and in response to receiving the information about the weight of the products: (i) determining, by the computing device, that a product has been added to or removed from the shelf, and (ii) in response to the determining that a product has been added to or removed from the shelf, further determining an SKU-identifier of the product added or removed.

In some embodiments, the method can additionally comprise the step of recording a change in an inventory management system. The method can additionally comprise the step of completing a retail sales transaction, using the result of the determining and of the further determining.

In embodiments, a retail sales system has a shelving unit as disclosed herein, or substantially as described herein.

In embodiments, a shelving unit having weighing capabilities comprises: (a) at least a first shelf assembly, each shelf assembly including: (i) a shelf; (ii) a plurality of load cell assemblies, each planar load cell assembly comprising at least one load cell arrangement disposed on a single metal load cell body, the load cell body having a primary axis, a central longitudinal axis, and a transverse axis disposed transversely with respect to the primary and central longitudinal axes, a broad dimension of the load cell body being disposed perpendicular to the primary axis, each load cell arrangement including: (A) a first contiguous cutout window passing through the broad dimension and formed by a first pair of cutout lines disposed generally parallel to the central longitudinal axis, and connected by a first cutout base; (B) a second contiguous cutout window passing through the broad dimension and formed by a second pair of cutout lines disposed generally parallel to the central longitudinal axis, and connected by a second cutout base, wherein the second contiguous cutout window is transversely bounded by the first contiguous cutout window; (C) a pair of measuring beams disposed along opposite edges of the load cell body and generally parallel to the central longitudinal axis, each of the measuring beams longitudinally defined by a respective cutout line of the first pair of cutout lines; (D) a first flexure arrangement having a first pair of flexure beams, disposed along opposite sides of the central longitudinal axis, and generally parallel thereto, the first pair of flexure beams longitudinally disposed between the first pair of cutout lines and the second pair of cutout lines, and mechanically connected by a first flexure base; (E) a loading element, longitudinally defined by an innermost pair of cutout lines, comprising a receiving element and extending from an innermost flexure base, the transverse axis passing through the loading element; and (F) at least one strain gage, fixedly attached to a surface of a measuring beam of the measuring beams; and (iii) a load cell base, adapted to anchor the anchored portion of the load cell body, and optionally adapted to anchor each anchored portion of each load cell body of each of the plurality of load cell assemblies, wherein the load cell base is attached to the load cell body at the anchored portion thereof; (b) a shelving unit housing forming a shelving volume horizontally bounded by left, right, and back walls; and (c) an attachment element, attached to one of the left, right and back walls, wherein the attachment element effects securement of the shelf assembly to one of left, right and back walls.

In some embodiments, each shelf assembly can additionally comprise at least one protruding element, wherein the at least one protruding element is vertically aligned with the at least one receiving element, whereby, in the loaded disposition, the at least one receiving element receives the vertical load via the at least one protruding element.

In some embodiments, the shelving unit can further comprise an attachment component for securing the shelf assembly to the attachment element, wherein the securing includes attaching the attachment component to an attachment-element-point of the attachment element and mating the attachment component to an attachment point of the shelf assembly.

In some embodiments, the securement of the shelf assembly to one of the left, right and back walls can include securement of the load cell base to the left and right walls.

In some embodiments, the shelf assembly can comprise a plurality of load cell bases, wherein the attachment of the shelf assembly to the left and right walls is by attachment of at least one load cell base to each of the left and right walls.

In some embodiments, the attachment elements can be adapted for fixed attachment of the load cell bases.

In some embodiments, the shelf can comprise an upwardly extending rim member on at least one of the four sides of the shelf, the rim member being sized and/or disposed so as to prevent a product borne by the shelf to transfer any of its weight load directly to a wall or door of the shelving unit by leaning thereupon.

In some embodiments, the shelf can comprise an upwardly extending dividing member, the dividing member being sized and/or disposed so as to prevent a product borne by the shelf to transfer any of its weight load to another product borne by the shelf by leaning thereupon.

In some embodiments, it can be that (i) the width of the shelf assembly is more than half the interior width of the enclosure and (ii) for any given height of the enclosure there is at most one shelf assembly.

In some embodiments, the shelving unit can additionally comprise a retail transaction apparatus. In some embodiments, the shelving unit can additionally comprise a door that includes an electronically engageable lock.

In some embodiments, the load cell assembly can comprise a double ended load cell.

In some embodiments, the load cell assembly can comprise a load cell having a flexural member. In such embodiments, the flexural member can be an integral portion of the load cell body.

In some embodiments, the strain gage is associated with a processing unit configured to receive strain signals therefrom, and to produce a weight indication based on the strain signals. In such embodiments, the shelving unit can additionally comprise a communications arrangement for sending information about the weight indication to a computing device. In such embodiments, the shelving unit can additionally comprise the computing device, wherein the computing device includes program instructions stored in a non-transitory computer-readable storage medium, which when executed by one or more processors of the computing device cause the one or more processors to determine, based on the information, that a product has been added to or removed from a shelf. In some such embodiments, it can be that the product is a member of a group of products characterized by a plurality of SKU-identifiers, and the determining by the one or more processors additionally includes determining the SKU-identifier of the product that has been added or removed from the shelf. In some such embodiments, the result of the determining by the software module can be further used to perform at least one of a retail sales transaction and an inventory adjustment in a computerized inventory system.

In some embodiments, the shelving unit can additionally comprise a refrigeration unit.

In some embodiments, each shelf assembly can have exactly one respective load cell base, each one respective load cell base supporting all of the plurality of load cell assemblies of the respective shelf assembly.

In some embodiments, the plurality of load cell assemblies of the shelf assembly can consist of 4 load cell assemblies.

In some embodiments, each shelf assembly may extend substantially from the left wall to the right wall.

In some embodiments, the shelving unit comprises a plurality of attachment elements, of which at least one is attached to the left wall and at least one is attached to the right wall.

A method is disclosed for tracking inventory of products displayed on shelf assemblies installed in a shelving unit, each shelf assembly having a width more than half the internal width of the shelving unit such that the shelving unit includes no more than one shelf assembly at any given height. The method comprises: (a) storing products characterized by a plurality of SKU-identifiers on a shelf assembly with weighing capabilities, the shelf assembly comprising a load cell assembly including (i) a load cell body having a free end and an anchored portion, the load cell body including a spring element and at least one receiving element, (ii) a strain-sensing gage, bonded to the spring element, the strain-sensing gage adapted to measure a strain in the spring element, in the loaded disposition, and (iii) a load cell base including securement arrangements for attaching the shelf assembly to a shelving unit, the securement arrangements being placed so as to engage with corresponding securement elements on respective left and right side walls of the shelving unit; (b) tracking the weight of the products on the shelf, using the load cell assembly; (c) in response to a change in weight of the products on the shelf, sending information about the weight of the products from the load cell assembly to a computing device; and (d) in response to receiving the information about the weight of the products: (i) determining, by the computing device, that a product has been added to or removed from the shelf, and (ii) in response to the determining that a product has been added to or removed from the shelf, further determining an SKU-identifier of the product added or removed.

In some embodiments, the method can additionally comprise the step of recording a change in an inventory management system.

In some embodiments, the method can additionally comprise the step of completing a retail sales transaction, using the result of the determining and of the further determining.

As used herein in the specification and in the claims section that follows, the term "generally", "substantially", etc., with respect to orientations and measurements such as "parallel" and "central", is meant to limit the deviation to within ±10%. More typically, this deviation is within ±5%, ±3%, ±2%, ±1%, ±0.5%, ±0.2%, or less.

Unless otherwise defined herein, words and phrases used herein are to be understood in accordance with their usual meaning in normal usage. Some terms used herein are terms of art in the industries that supply and use shelving assemblies, for example (and not exhaustively): An "upright" is a post or rod fixed vertically as a structural support for other components in a shelving unit and to bear the load of the shelves and any goods displayed thereupon, generally including holes or other arrangements along at least two faces for the attachment of shelf brackets. An upright, unless it is at the end of continuous run of shelving, is shared by two adjacent shelving units and therefore a standard "shelving unit" is considered to include only one upright. In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a shelf" or "at least one shelf" may include a plurality of markings.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A shelf assembly for tracking the weight of non-homogeneous products stored thereupon in a refrigerator, the shelf assembly comprising:
   a. a weighing base comprising:
      i. opposing load-cell bases detachably attached to respective left and right internal walls of the refrigerator,
      ii. a rigid shelf frame, at least 25% of the horizontal surface area thereof being open to permit a vertical airflow therethrough;
   b. a respective plurality of load cell assemblies fixedly attached to each of said opposing load-cell bases each load cell assembly comprising:
      i. a load cell body having a free end and an anchored portion, and including a spring element and a receiving element, and ii. a strain-sensing gage, bonded to said spring element and adapted to measure a strain therein; and c. a shelf disposed upon said plurality of load cell assemblies, at least 50% of the horizontal surface area of the shelf being open to permit a vertical airflow therethrough, and, wherein (i) said load cell body is attached to said horizontal member at said anchored portion of the load cell body, and (ii) said at least one receiving element is adapted to receive a vertical load from the shelf, said receiving element has (A) an unloaded disposition, and (B) a loaded disposition in which said at least one receiving element receives said vertical load, wherein in said loaded disposition, said free end attains a depressed position with respect to said free end in said unloaded disposition.

2. The shelf assembly of claim 1, wherein:
i. said load cell body has a primary axis, a central longitudinal axis, and a transverse axis disposed transversely with respect to said primary and central longitudinal axes, a broad dimension of said load cell body being disposed perpendicular to said primary axis, and
ii. said load cell body includes:
A. a first contiguous cutout window passing through said broad dimension and formed by a first pair of cutout lines disposed generally parallel to said central longitudinal axis, and connected by a first cutout base,
B. a second contiguous cutout window passing through said broad dimension and formed by a second pair of cutout lines disposed generally parallel to said central longitudinal axis, and connected by a second cutout base, said second contiguous cutout window being transversely bounded by said first contiguous cutout window,
C. a pair of measuring beams disposed along opposite edges of said load cell body and generally parallel to said central longitudinal axis, each of said measuring beams longitudinally defined by a respective cutout line of said first pair of cutout lines,
D. a first flexure arrangement having a first pair of flexure beams, disposed along opposite sides of said central longitudinal axis, and generally parallel thereto, said first pair of flexure beams longitudinally disposed between said first pair of cutout lines and said second pair of cutout lines, and mechanically connected by a first flexure base, and
E. a loading element, longitudinally defined by an innermost pair of cutout lines, comprising a receiving element and extending from an innermost flexure base, said transverse axis passing through said loading element.

3. The shelf assembly of claim 2, wherein said load cell body additionally includes:
F. a third contiguous cutout window passing through said broad dimension and formed by a third pair of cutout lines disposed parallel to said central longitudinal axis, and connected by a third cutout base, and
G. a second flexure arrangement having a second pair of flexure beams, disposed along opposite sides of said central longitudinal axis, and parallel thereto, said second pair of flexure beams longitudinally disposed between said second pair of cutout lines and said third pair of cutout lines, and mechanically connected by a second flexure base, wherein said loading element is longitudinally defined by said third pair of cutout lines, and extending from said second flexure base.

4. The shelf assembly of claim 1, wherein said at least one strain-sensing gage is associated with a processing unit configured to receive strain signals therefrom, and to produce a weight indication based on said strain signals.

5. The shelf assembly of claim 4, comprising a communications arrangement for sending information about the weight indication to a computing device, wherein the computing device includes a software module for determining, based on the information, that a product has been added to or removed from a shelf.

6. The shelf assembly of claim 5, wherein the product is a member of a group of non-homogeneous products, and the determining by the software module additionally includes identifying the product that has been added or removed from the shelf.

7. The shelf assembly of claim 6, wherein the group of non-homogeneous products is characterized by a plurality of SKU-identifiers, and the identifying includes identifying a SKU-identifier.

8. The shelf assembly of claim 6, wherein said computing device includes a software module for performing, based on the result of the determining, at least one of a retail sales transaction and an inventory adjustment in a computerized inventory system.

9. The shelf assembly of claim 1, wherein (i) the shelf comprises a wire-grid shelf, (ii) said pluralities of load-cell assemblies are arranged to form opposing pairs of load-cell assemblies, and (iii) the wire-grid shelf includes a plurality of left-to-right wires disposed such that each opposing pair of said opposing pairs of load-cell assemblies is in contact with at least one respective left-to-right wire.

10. The shelf assembly of claim 1, wherein said shelf comprises an upwardly extending rim member on at least one of the four sides of said shelf, said rim member being sized and/or disposed so as to prevent a product borne by said shelf to transfer any of its weight load directly to a wall or door of the shelving unit by leaning thereupon.

11. The shelf assembly of claim 1, wherein at least 40% of the horizontal surface area of said rigid shelf frame is open to permit a vertical airflow therethrough.

12. A display refrigerator, comprising:
a. a plurality of shelf assemblies, wherein each one is a shelf assembly according to claim 6; and
b. a computing device including a software module for determining that a product has been added to or removed from a shelf, said determining additionally including identifying the product that has been added or removed from the shelf.

13. The refrigerator of claim 12, additionally comprising a retail transaction apparatus.

14. A method of tracking inventory of non-homogeneous products in a refrigerator, the method comprising:
a. tracking weight of non-homogeneous products stored on a shelf assembly disposed in the refrigerator, the shelf assembly comprising (i) opposing load-cell bases detachably attached to respective left and right internal walls of the refrigerator, (ii) a rigid shelf frame, at least 25% of the horizontal surface area thereof being open to a vertical airflow therethrough, (iii) a respective plurality of load cell assemblies fixedly attached to each of said opposing load-cell bases, each load cell assembly comprising: (A) a load cell body having a free end and an anchored portion, and including a spring element and at least one receiving element, and (B) a strain-sensing gage, bonded to said spring element and adapted to measure a strain in said spring element, and (iv) a shelf disposed upon said plurality of load cell assemblies, at least 50% of the horizontal surface area of the shelf being open to permit a vertical airflow therethrough;

b. in response to a change in weight of the products on the shelf assembly, sending information about the weight of the products from at least one weighing assembly of said plurality of weighing assemblies to a computing device; and c. in response to receiving the information about the weight of the products:
  i. determining, by the computing device, that a product has been added to or removed from the shelf assembly, and
  ii. in response to the determining that a product has been added to or removed from the shelf assembly, identifying the product added or removed.

15. The method of claim 14, wherein the products are characterized by a plurality of SKU-identifiers, and the identifying includes determining an SKU-identifier.

16. The method of claim 14, additionally comprising the step of recording a change in an inventory management system.

17. The method of claim 14, additionally comprising the step of completing a retail sales transaction, using the result of the determining and of the further determining.

18. The method of claim 14, wherein (i) the shelf comprises a wire-grid shelf, (ii) said pluralities of load-cell assemblies are arranged to form opposing pairs of load-cell assemblies, and (iii) the wire-grid shelf includes a plurality of left-to-right wires disposed such that each opposing pair of said opposing pairs of load-cell assemblies is in contact with at least one respective left-to-right wire.

19. The shelf assembly of claim 1, wherein the rigid shelf frame is formed by a joining of at least one beam member and said opposing load-cell bases.

20. The method of claim 14, wherein the rigid shelf frame is formed by a joining of at least one beam member and said opposing load-cell bases.

* * * * *